(12) United States Patent
Backholm

(10) Patent No.: US 8,494,510 B2
(45) Date of Patent: *Jul. 23, 2013

(54) PROVISIONING APPLICATIONS FOR A MOBILE DEVICE

(75) Inventor: Ari Backholm, Palo Alto, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,664

(22) Filed: Dec. 6, 2011

(65) Prior Publication Data

US 2012/0077482 A1    Mar. 29, 2012

Related U.S. Application Data

(63) Continuation of application No. 12/215,481, filed on Jun. 26, 2008, now Pat. No. 8,078,158.

(51) Int. Cl.
*H04W 8/22* (2009.01)

(52) U.S. Cl.
USPC .......... 455/419; 455/414.1; 455/551

(58) Field of Classification Search
USPC .... 455/418–420; 709/201–246; 717/168–178
See application file for complete search history.

(56) References Cited

U.S. PATENT DOCUMENTS

| 222,458 | A | 12/1879 | Connolly et al. |
| 447,918 | A | 3/1891 | Strowger |
| 4,200,770 | A | 4/1980 | Hellman et al. |
| 4,255,796 | A | 3/1981 | Gabbe et al. |
| 4,276,597 | A | 6/1981 | Dissly et al. |
| 4,531,020 | A | 7/1985 | Wechselberger et al. |
| 4,807,182 | A | 2/1989 | Queen |
| 4,831,582 | A | 5/1989 | Miller et al. |
| 4,875,159 | A | 10/1989 | Cary et al. |
| 4,897,781 | A | 1/1990 | Chang et al. |
| 4,972,457 | A | 11/1990 | O'Sullivan |
| 5,008,853 | A | 4/1991 | Bly et al. |

(Continued)

FOREIGN PATENT DOCUMENTS

| EP | 0772327 A2 | 5/1997 |
| EP | 0993165 A2 | 4/2000 |

(Continued)

OTHER PUBLICATIONS

Adwankar, Sandeep et al., "Universal Manager: Seamless Management of Enterprise Mobile and Non-Mobile Devices," Proceedings of the 2004 IEEE International Conference on Mobile Data Management, 12 pages, 2004.

(Continued)

*Primary Examiner* — Kashif Siddiqui
(74) *Attorney, Agent, or Firm* — Perkins Coie LLP

(57) ABSTRACT

Methods and systems for provisioning an application for a mobile device are provided. A user may request an application. A request concerning the application is sent to a provisioning device. The request includes information concerning the mobile device and/or the user of the mobile device. The information is used to determine the requirements for operating the requested application on the mobile device. A hyperlink for downloading the requirements information is sent to the user of the mobile device via text messaging and/or email. The requirements information may be provided directly to the mobile device, to a personal computing device associated with the user of the mobile device, or a combination.

23 Claims, 3 Drawing Sheets

U.S. PATENT DOCUMENTS

| | | |
|---|---|---|
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,491,703 A | 2/1996 | Barnaby et al. |
| 5,493,692 A | 2/1996 | Theimer et al. |
| 5,519,606 A | 5/1996 | Frid-Nielsen et al. |
| 5,537,464 A | 7/1996 | Lewis et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,644,788 A | 7/1997 | Courtright et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,673,322 A | 9/1997 | Pepe et al. |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,940,813 A | 8/1999 | Hutchings |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,197 A | 12/1999 | d'Eon et al. |
| 6,006,274 A | 12/1999 | Hawkins et al. |
| 6,016,478 A | 1/2000 | Zhang et al. |
| 6,016,520 A | 1/2000 | Facq et al. |

| | | | |
|---|---|---|---|
| 6,018,762 A | 1/2000 | Brunson et al. | |
| 6,023,700 A | 2/2000 | Owens et al. | |
| 6,023,708 A | 2/2000 | Mendez et al. | |
| 6,029,238 A | 2/2000 | Furukawa | |
| 6,034,621 A | 3/2000 | Kaufman | |
| 6,035,104 A | 3/2000 | Zahariev | |
| 6,044,372 A | 3/2000 | Rothfus et al. | |
| 6,044,381 A | 3/2000 | Boothby et al. | |
| 6,047,051 A | 4/2000 | Ginzboorg et al. | |
| 6,047,327 A | 4/2000 | Tso et al. | |
| 6,052,563 A | 4/2000 | Macko | |
| 6,052,735 A | 4/2000 | Ulrich et al. | |
| 6,057,855 A | 5/2000 | Barkans | |
| 6,065,055 A | 5/2000 | Hughes et al. | |
| 6,073,138 A | 6/2000 | de l'Etraz et al. | |
| 6,073,142 A | 6/2000 | Geiger et al. | |
| 6,073,165 A | 6/2000 | Narasimhan et al. | |
| 6,085,166 A | 7/2000 | Beckhardt et al. | |
| 6,085,192 A | 7/2000 | Mendez et al. | |
| 6,088,677 A | 7/2000 | Spurgeon | |
| 6,101,320 A | 8/2000 | Schuetze et al. | |
| 6,101,480 A | 8/2000 | Conmy et al. | |
| 6,101,531 A | 8/2000 | Eggleston et al. | |
| 6,112,181 A | 8/2000 | Shear et al. | |
| 6,119,014 A | 9/2000 | Alperovich et al. | |
| 6,119,171 A | 9/2000 | Alkhatib | |
| 6,125,369 A | 9/2000 | Wu et al. | |
| 6,125,388 A | 9/2000 | Reisman | |
| 6,128,627 A | 10/2000 | Mattis et al. | |
| 6,130,898 A | 10/2000 | Kostreski et al. | |
| 6,131,096 A | 10/2000 | Ng et al. | |
| 6,131,116 A | 10/2000 | Riggins et al. | |
| 6,134,432 A | 10/2000 | Holmes et al. | |
| 6,138,013 A | 10/2000 | Blanchard et al. | |
| 6,138,124 A | 10/2000 | Beckhardt | |
| 6,138,128 A | 10/2000 | Perkowitz et al. | |
| 6,138,146 A | 10/2000 | Moon et al. | |
| 6,141,664 A | 10/2000 | Boothby | |
| 6,151,606 A | 11/2000 | Mendez | |
| 6,157,630 A | 12/2000 | Adler et al. | |
| 6,161,140 A | 12/2000 | Moriya | |
| 6,167,379 A | 12/2000 | Dean et al. | |
| 6,167,435 A | 12/2000 | Druckenmiller et al. | |
| 6,170,014 B1 | 1/2001 | Darago et al. | |
| 6,173,312 B1 | 1/2001 | Atarashi et al. | |
| 6,173,446 B1 | 1/2001 | Khan et al. | |
| 6,175,831 B1 | 1/2001 | Weinreich et al. | |
| 6,178,419 B1 | 1/2001 | Legh-Smith et al. | |
| 6,181,935 B1 | 1/2001 | Gossman et al. | |
| 6,185,184 B1 | 2/2001 | Mattaway et al. | |
| 6,195,533 B1 | 2/2001 | Tkatch et al. | |
| 6,198,696 B1 | 3/2001 | Korpi et al. | |
| 6,198,922 B1 | 3/2001 | Baynham | |
| 6,201,469 B1 | 3/2001 | Balch et al. | |
| 6,202,085 B1 | 3/2001 | Benson et al. | |
| 6,205,448 B1 | 3/2001 | Kruglikov et al. | |
| 6,212,529 B1 | 4/2001 | Boothby et al. | |
| 6,219,694 B1 | 4/2001 | Lazaridis et al. | |
| 6,221,877 B1 | 4/2001 | Aronov et al. | |
| 6,223,187 B1 | 4/2001 | Boothby et al. | |
| 6,226,686 B1 | 5/2001 | Rothschild et al. | |
| 6,233,341 B1 | 5/2001 | Riggins | |
| 6,243,705 B1 | 6/2001 | Kucala | |
| 6,246,875 B1 | 6/2001 | Seazholtz et al. | |
| 6,247,135 B1 | 6/2001 | Feague | |
| 6,249,808 B1 | 6/2001 | Seshadri | |
| 6,256,666 B1 | 7/2001 | Singhal | |
| 6,263,201 B1 | 7/2001 | Hashimoto et al. | |
| 6,263,340 B1 | 7/2001 | Green | |
| 6,269,369 B1 | 7/2001 | Robertson | |
| 6,272,545 B1 | 8/2001 | Flanagin et al. | |
| 6,275,850 B1 | 8/2001 | Beyda et al. | |
| 6,275,858 B1 | 8/2001 | Bates et al. | |
| 6,289,212 B1 | 9/2001 | Stein et al. | |
| 6,289,214 B1 | 9/2001 | Backstrom | |
| 6,292,904 B1 | 9/2001 | Broomhall et al. | |
| 6,295,541 B1 | 9/2001 | Bodnar et al. | |
| 6,300,947 B1 | 10/2001 | Kanevsky | |
| 6,304,881 B1 | 10/2001 | Halim et al. | |
| 6,308,201 B1 | 10/2001 | Pivowar et al. | |
| 6,317,594 B1 | 11/2001 | Gossman et al. | |
| 6,320,943 B1 | 11/2001 | Borland | |
| 6,324,541 B1 | 11/2001 | de l'Etraz et al. | |
| 6,324,542 B1 | 11/2001 | Wright, Jr. et al. | |
| 6,324,544 B1 | 11/2001 | Alam et al. | |
| 6,324,587 B1 | 11/2001 | Trenbeath et al. | |
| 6,327,586 B1 | 12/2001 | Kisiel | |
| 6,336,117 B1 | 1/2002 | Massarani | |
| 6,336,138 B1 | 1/2002 | Caswell et al. | |
| 6,351,767 B1 | 2/2002 | Batchelder et al. | |
| 6,356,937 B1 | 3/2002 | Montville et al. | |
| 6,363,051 B1 | 3/2002 | Eslambolchi et al. | |
| 6,363,352 B1 | 3/2002 | Dailey et al. | |
| 6,370,566 B2 | 4/2002 | Discolo et al. | |
| 6,377,810 B1 | 4/2002 | Geiger et al. | |
| 6,380,959 B1 | 4/2002 | Wang et al. | |
| 6,389,422 B1 | 5/2002 | Doi et al. | |
| 6,389,455 B1 | 5/2002 | Fuisz | |
| 6,389,457 B2 | 5/2002 | Lazaridis et al. | |
| 6,397,057 B1 | 5/2002 | Malackowski et al. | |
| 6,397,230 B1 | 5/2002 | Carmel et al. | |
| 6,401,104 B1 | 6/2002 | LaRue et al. | |
| 6,401,112 B1 | 6/2002 | Boyer et al. | |
| 6,401,113 B2 | 6/2002 | Lazaridis et al. | |
| 6,405,197 B2 | 6/2002 | Gilmour | |
| 6,411,696 B1 | 6/2002 | Iverson et al. | |
| 6,415,031 B1 | 7/2002 | Colligan et al. | |
| 6,418,308 B1 | 7/2002 | Heinonen et al. | |
| 6,421,669 B1 | 7/2002 | Gilmour et al. | |
| 6,421,781 B1 | 7/2002 | Fox et al. | |
| 6,430,602 B1 | 8/2002 | Kay et al. | |
| 6,438,585 B2 | 8/2002 | Mousseau et al. | |
| 6,438,612 B1 | 8/2002 | Ylonen et al. | |
| 6,442,589 B1 | 8/2002 | Takahashi et al. | |
| 6,442,637 B1 | 8/2002 | Hawkins et al. | |
| 6,446,118 B1 | 9/2002 | Gottlieb | |
| 6,463,463 B1 | 10/2002 | Godfrey et al. | |
| 6,463,464 B1 | 10/2002 | Lazaridis et al. | |
| 6,484,203 B1 | 11/2002 | Porras et al. | |
| 6,487,557 B1 | 11/2002 | Nagatomo | |
| 6,487,560 B1 | 11/2002 | LaRue et al. | |
| 6,490,353 B1 | 12/2002 | Tan | |
| 6,496,802 B1 | 12/2002 | van Zoest et al. | |
| 6,499,054 B1 | 12/2002 | Hesselink et al. | |
| 6,505,214 B1 | 1/2003 | Sherman et al. | |
| 6,516,327 B1 | 2/2003 | Zondervan et al. | |
| 6,526,433 B1 | 2/2003 | Chang et al. | |
| 6,526,506 B1 | 2/2003 | Lewis | |
| 6,529,908 B1 | 3/2003 | Piett et al. | |
| 6,532,446 B1 | 3/2003 | King | |
| 6,535,892 B1 | 3/2003 | LaRue et al. | |
| 6,546,005 B1 | 4/2003 | Berkley et al. | |
| 6,549,939 B1 | 4/2003 | Ford et al. | |
| 6,556,217 B1 | 4/2003 | Mäkipää et al. | |
| 6,593,944 B1 | 7/2003 | Nicolas et al. | |
| 6,601,026 B2 | 7/2003 | Appelt et al. | |
| 6,615,253 B1 | 9/2003 | Bowman-Amuah | |
| 6,618,710 B1 | 9/2003 | Zondervan et al. | |
| 6,621,892 B1 | 9/2003 | Banister et al. | |
| 6,622,157 B1 | 9/2003 | Heddaya et al. | |
| 6,625,621 B1 | 9/2003 | Tan et al. | |
| 6,636,482 B2 | 10/2003 | Cloonan et al. | |
| 6,639,693 B1 | 10/2003 | Ejiri et al. | |
| 6,640,097 B2 | 10/2003 | Corrigan et al. | |
| 6,640,244 B1 | 10/2003 | Bowman-Amuah | |
| 6,640,249 B1 | 10/2003 | Bowman-Amuah | |
| 6,643,650 B1 | 11/2003 | Slaughter et al. | |
| 6,643,688 B1 | 11/2003 | Fuisz | |
| 6,647,384 B2 | 11/2003 | Gilmour | |
| 6,650,890 B1 | 11/2003 | Irlam et al. | |
| 6,662,016 B1 | 12/2003 | Buckham et al. | |
| 6,668,046 B1 | 12/2003 | Albal | |
| 6,671,695 B2 | 12/2003 | McFadden | |
| 6,671,700 B1 | 12/2003 | Creemer et al. | |
| 6,671,702 B2 | 12/2003 | Kruglikov et al. | |
| 6,671,757 B1 | 12/2003 | Multer et al. | |
| 6,694,336 B1 | 2/2004 | Multer et al. | |
| 6,697,807 B2 | 2/2004 | McGeachie | |

| | | |
|---|---|---|
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,742,059 B1 | 5/2004 | Todd et al. |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,757,708 B1 | 6/2004 | Craig et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,965,968 B1 | 11/2005 | Touboul |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhal et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,996,627 B1 | 2/2006 | Carden |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,080,371 B1 * | 7/2006 | Arnaiz et al. ................ 717/170 |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,210,121 B2 | 4/2007 | Xia et al. |
| 7,219,139 B2 | 5/2007 | Martin et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,260,651 B2 | 8/2007 | Parrella, Sr. et al. |
| 7,272,830 B2 | 9/2007 | de Jong |
| 7,277,408 B2 | 10/2007 | Sorsa |
| 7,284,664 B1 | 10/2007 | Ivchenko et al. |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,296,155 B1 | 11/2007 | Trostle et al. |
| 7,305,252 B2 | 12/2007 | Britt et al. |
| 7,305,700 B2 | 12/2007 | Boynton et al. |
| 7,310,350 B2 | 12/2007 | Shao et al. |
| 7,310,729 B2 | 12/2007 | Gordon et al. |
| 7,324,473 B2 | 1/2008 | Corneille et al. |
| 7,337,219 B1 | 2/2008 | Meenan et al. |
| 7,343,396 B2 | 3/2008 | Kausik et al. |
| 7,349,871 B2 | 3/2008 | Labrou et al. |
| 7,353,274 B1 | 4/2008 | Rouhi et al. |
| 7,359,720 B2 | 4/2008 | Hartmaier et al. |
| 7,373,386 B2 | 5/2008 | Gardner et al. |
| 7,373,661 B2 | 5/2008 | Smith et al. |
| 7,374,099 B2 | 5/2008 | de Jong |
| 7,376,701 B2 | 5/2008 | Bhargava et al. |
| 7,382,879 B1 | 6/2008 | Miller |

| Patent | Date | Inventor |
|---|---|---|
| 7,383,339 B1 | 6/2008 | Meenan et al. |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,443,847 B1 | 10/2008 | Albert et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,472,424 B2 | 12/2008 | Evans et al. |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Kasriel et al. |
| 7,548,969 B2 | 6/2009 | Tripp et al. |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |
| 7,584,294 B2 | 9/2009 | Plamondon |
| 7,587,482 B2 | 9/2009 | Henderson et al. |
| 7,587,608 B2 | 9/2009 | Haller et al. |
| 7,593,714 B2 | 9/2009 | Schultz et al. |
| 7,596,608 B2 | 9/2009 | Alexander et al. |
| 7,596,791 B2 | 9/2009 | Wei et al. |
| 7,613,792 B2 | 11/2009 | Zervas et al. |
| 7,630,986 B1 | 12/2009 | Herz et al. |
| 7,634,558 B1 | 12/2009 | Mangal et al. |
| 7,636,763 B1 | 12/2009 | Fein et al. |
| 7,643,818 B2 | 1/2010 | Backholm et al. |
| 7,644,166 B2 | 1/2010 | Appelman et al. |
| 7,647,047 B2 | 1/2010 | Moghaddam et al. |
| 7,650,416 B2 | 1/2010 | Wu et al. |
| 7,672,291 B2 | 3/2010 | Wang |
| 7,672,439 B2 | 3/2010 | Appelman et al. |
| 7,680,281 B2 | 3/2010 | Fiatal et al. |
| 7,684,346 B2 | 3/2010 | Valli |
| 7,689,664 B2 * | 3/2010 | Karlberg ................ 709/217 |
| 7,693,555 B2 | 4/2010 | Srinivasan et al. |
| 7,693,944 B2 | 4/2010 | Appelman et al. |
| 7,694,008 B2 | 4/2010 | Chang et al. |
| 7,706,781 B2 | 4/2010 | Backholm et al. |
| 7,707,573 B1 | 4/2010 | Marmaros et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,770,223 B2 | 8/2010 | Shevenell et al. |
| 7,778,792 B2 | 8/2010 | Huang et al. |
| 7,783,757 B2 | 8/2010 | Plamondon |
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,849,507 B1 | 12/2010 | Bloch et al. |
| 7,853,563 B2 | 12/2010 | Alvarado et al. |
| 7,873,609 B2 | 1/2011 | Kim et al. |
| 7,877,703 B1 | 1/2011 | Fleming |
| 7,877,807 B2 | 1/2011 | Shipp |
| 7,881,745 B1 * | 2/2011 | Rao et al. ................ 455/551 |
| 7,899,996 B1 | 3/2011 | Levin-Michael |
| 7,908,656 B1 | 3/2011 | Mu |
| 7,917,468 B2 | 3/2011 | Ariel et al. |
| 7,917,505 B2 | 3/2011 | van Gent et al. |
| 7,921,167 B2 | 4/2011 | Shroff et al. |
| 7,930,416 B2 | 4/2011 | Miller et al. |
| 7,933,929 B1 | 4/2011 | McClendon et al. |
| 7,937,091 B2 | 5/2011 | Roman et al. |
| 7,970,860 B2 | 6/2011 | Kline et al. |
| 7,996,487 B2 | 8/2011 | Snyder |
| 8,005,891 B2 | 8/2011 | Knowles et al. |
| 8,010,082 B2 | 8/2011 | Sutaria et al. |
| 8,032,409 B1 | 10/2011 | Mikurak |
| 8,064,583 B1 | 11/2011 | Sutaria et al. |
| 8,069,166 B2 | 11/2011 | Alvarado et al. |
| 8,074,162 B1 | 12/2011 | Cohen |
| 8,078,158 B2 | 12/2011 | Backholm |
| 8,107,921 B2 | 1/2012 | Fiatal |
| 8,116,214 B2 | 2/2012 | Backholm et al. |
| 8,127,342 B2 | 2/2012 | Boynton et al. |
| 8,131,763 B2 | 3/2012 | Tuscano et al. |
| 8,166,164 B1 | 4/2012 | Luna et al. |
| 8,190,701 B2 | 5/2012 | Luna et al. |
| 8,194,680 B1 | 6/2012 | Brandwine et al. |
| 8,204,953 B2 | 6/2012 | Luna et al. |
| 8,209,709 B2 | 6/2012 | Fleming |
| 8,239,915 B1 | 8/2012 | Satish et al. |
| 8,260,852 B1 | 9/2012 | Cselle |
| 8,291,076 B2 | 10/2012 | Luna et al. |
| 8,316,098 B2 | 11/2012 | Luna et al. |
| 8,326,985 B2 | 12/2012 | Luna et al. |
| 8,356,080 B2 | 1/2013 | Luna et al. |
| 8,364,181 B2 | 1/2013 | Backholm et al. |
| 8,412,675 B2 | 4/2013 | Alvarado et al. |
| 2001/0009025 A1 | 7/2001 | Ahonen |
| 2001/0010046 A1 | 7/2001 | Muyres et al. |
| 2001/0013069 A1 | 8/2001 | Shah |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0052052 A1 | 12/2001 | Peng |
| 2001/0053687 A1 | 12/2001 | Sivula |
| 2002/0002478 A1 | 1/2002 | Swart et al. |
| 2002/0002591 A1 | 1/2002 | Ketola |
| 2002/0004746 A1 | 1/2002 | Ferber et al. |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0032671 A1 | 3/2002 | Iinuma |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0049857 A1 | 4/2002 | Farber et al. |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059251 A1 | 5/2002 | Stern et al. |
| 2002/0059457 A1 | 5/2002 | Ballard et al. |
| 2002/0068559 A1 | 6/2002 | Sharma et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0087883 A1 | 7/2002 | Wohlgemuth et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0103934 A1 | 8/2002 | Fishman et al. |
| 2002/0107944 A1 | 8/2002 | Bai et al. |
| 2002/0107985 A1 | 8/2002 | Hwang et al. |
| 2002/0116499 A1 | 8/2002 | Ennus et al. |

| Publication No. | Date | Inventor |
|---|---|---|
| 2002/0116501 A1 | 8/2002 | Ho et al. |
| 2002/0120388 A1 | 8/2002 | Bullock |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0128908 A1 | 9/2002 | Levin et al. |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts, III et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 | 11/2002 | Hatanaka et al. |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0014491 A1 | 1/2003 | Horvitz et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0046433 A1 | 3/2003 | Luzzatti et al. |
| 2003/0046586 A1 | 3/2003 | Bheemarasetti et al. |
| 2003/0046587 A1 | 3/2003 | Bheemarasetti et al. |
| 2003/0050041 A1 | 3/2003 | Wu |
| 2003/0051142 A1 | 3/2003 | Hidalgo et al. |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0145038 A1 | 7/2003 | Bin Tariq et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182420 A1 | 9/2003 | Jones et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227487 A1 | 12/2003 | Hugh |
| 2003/0227745 A1 | 12/2003 | Khoo |
| 2003/0235308 A1 | 12/2003 | Boynton et al. |
| 2003/0236857 A1 | 12/2003 | Takase et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0010590 A1 | 1/2004 | Manzano |
| 2004/0015504 A1 | 1/2004 | Ahad et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0047356 A1 | 3/2004 | Bauer |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0073867 A1 | 4/2004 | Kausik et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0110497 A1* | 6/2004 | Little .................. 455/418 |
| 2004/0120323 A1 | 6/2004 | Viikari et al. |
| 2004/0123095 A1 | 6/2004 | Marshall |
| 2004/0123304 A1 | 6/2004 | Black et al. |
| 2004/0127214 A1 | 7/2004 | Reddy et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0148375 A1 | 7/2004 | Levett et al. |
| 2004/0151186 A1 | 8/2004 | Akama |
| 2004/0158611 A1 | 8/2004 | Daniell et al. |
| 2004/0162890 A1 | 8/2004 | Ohta |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins, III |
| 2004/0179513 A1 | 9/2004 | Smith et al. |
| 2004/0181550 A1 | 9/2004 | Warsta et al. |
| 2004/0184475 A1 | 9/2004 | Meier |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0204085 A1 | 10/2004 | Vargas et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0219940 A1 | 11/2004 | Kong et al. |
| 2004/0229609 A1 | 11/2004 | Yamaguchi |
| 2004/0230619 A1 | 11/2004 | Blanco et al. |
| 2004/0233930 A1 | 11/2004 | Colby, Jr. |
| 2004/0236792 A1 | 11/2004 | Celik |
| 2004/0242209 A1* | 12/2004 | Kruis et al. .................. 455/419 |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0260948 A1 | 12/2004 | Miyata et al. |
| 2004/0264396 A1 | 12/2004 | Ginzburg et al. |
| 2004/0266364 A1 | 12/2004 | Nguyen et al. |
| 2004/0268148 A1 | 12/2004 | Karjala et al. |

| | | |
|---|---|---|
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022000 A1 | 1/2005 | Inomata et al. |
| 2005/0022182 A1* | 1/2005 | Mittal ............................ 717/178 |
| 2005/0027591 A9 | 2/2005 | Gailey et al. |
| 2005/0027716 A1 | 2/2005 | Apfel |
| 2005/0027869 A1 | 2/2005 | Johnson |
| 2005/0033657 A1 | 2/2005 | Herrington et al. |
| 2005/0033812 A1 | 2/2005 | McCarthy et al. |
| 2005/0033926 A1 | 2/2005 | Dumont |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0050222 A1 | 3/2005 | Packer |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071674 A1 | 3/2005 | Chou et al. |
| 2005/0073982 A1 | 4/2005 | Corneille et al. |
| 2005/0075109 A1 | 4/2005 | Neyret et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0120181 A1 | 6/2005 | Arunagirinathan et al. |
| 2005/0122333 A1 | 6/2005 | Sumanaweera et al. |
| 2005/0124332 A1 | 6/2005 | Clark et al. |
| 2005/0125459 A1 | 6/2005 | Sutinen et al. |
| 2005/0138111 A1 | 6/2005 | Aton et al. |
| 2005/0138176 A1 | 6/2005 | Singh et al. |
| 2005/0138198 A1 | 6/2005 | May |
| 2005/0144219 A1 | 6/2005 | Terada |
| 2005/0147130 A1 | 7/2005 | Hurwitz et al. |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0164703 A1 | 7/2005 | Huynh |
| 2005/0164721 A1 | 7/2005 | Yeh et al. |
| 2005/0165909 A1 | 7/2005 | Cromer et al. |
| 2005/0170776 A1 | 8/2005 | Siorpaes |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0198170 A1 | 9/2005 | LeMay et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0216295 A1 | 9/2005 | Abrahamsohn |
| 2005/0222891 A1 | 10/2005 | Chan et al. |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little, II |
| 2005/0254443 A1 | 11/2005 | Campbell et al. |
| 2005/0256880 A1 | 11/2005 | Nam Koong et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al |
| 2006/0031114 A1 | 2/2006 | Zommers |
| 2006/0031300 A1 | 2/2006 | Kock et al. |
| 2006/0031365 A1 | 2/2006 | Kay et al. |
| 2006/0031428 A1 | 2/2006 | Wikman |
| 2006/0031785 A1 | 2/2006 | Raciborski |
| 2006/0031938 A1 | 2/2006 | Choi |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0052137 A1 | 3/2006 | Randall et al. |
| 2006/0059495 A1 | 3/2006 | Spector |
| 2006/0063544 A1 | 3/2006 | Zhao et al. |
| 2006/0065716 A1 | 3/2006 | Peters |
| 2006/0069686 A1 | 3/2006 | Beyda et al. |
| 2006/0069687 A1* | 3/2006 | Cui et al. ......................... 707/10 |
| 2006/0069715 A1 | 3/2006 | Vayssiere |
| 2006/0069742 A1 | 3/2006 | Segre |
| 2006/0069746 A1 | 3/2006 | Davis et al. |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093026 A1 | 5/2006 | Montojo et al. |
| 2006/0093135 A1 | 5/2006 | Fiatal et al. |
| 2006/0099969 A1 | 5/2006 | Staton et al. |
| 2006/0099970 A1 | 5/2006 | Morgan et al. |
| 2006/0112177 A1 | 5/2006 | Barkley et al. |
| 2006/0123042 A1 | 6/2006 | Xie et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hauf et al. |
| 2006/0149843 A1 | 7/2006 | Rhoads et al. |
| 2006/0149970 A1 | 7/2006 | Imazu |
| 2006/0155822 A1 | 7/2006 | Yang et al. |
| 2006/0161621 A1 | 7/2006 | Rosenberg |
| 2006/0165226 A1 | 7/2006 | Ernst et al. |
| 2006/0166663 A1 | 7/2006 | Haehnichen et al. |
| 2006/0167969 A1 | 7/2006 | Andreev et al. |
| 2006/0168043 A1 | 7/2006 | Eisenberger et al. |
| 2006/0168164 A1 | 7/2006 | Lemson |
| 2006/0179410 A1 | 8/2006 | Deeds |
| 2006/0188864 A1 | 8/2006 | Shah |
| 2006/0190428 A1 | 8/2006 | Jung et al. |
| 2006/0190569 A1 | 8/2006 | Neil et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0203765 A1 | 9/2006 | Laroia et al. |
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230394 A1* | 10/2006 | Forth et al. ..................... 717/168 |
| 2006/0234630 A1 | 10/2006 | Lai |
| 2006/0240804 A1 | 10/2006 | Backholm et al. |
| 2006/0240805 A1 | 10/2006 | Backholm et al. |
| 2006/0242137 A1 | 10/2006 | Shah et al. |
| 2006/0242210 A1 | 10/2006 | Ring et al. |
| 2006/0242320 A1 | 10/2006 | Nettle et al. |
| 2006/0242607 A1 | 10/2006 | Hudson |

| | | |
|---|---|---|
| 2006/0252435 A1 | 11/2006 | Henderson et al. |
| 2006/0253456 A1 | 11/2006 | Pacholec et al. |
| 2006/0253605 A1 | 11/2006 | Sundarrajan et al. |
| 2006/0259923 A1 | 11/2006 | Chiu |
| 2006/0265595 A1 | 11/2006 | Scottodiluzio |
| 2006/0271884 A1 | 11/2006 | Hurst |
| 2006/0277265 A1 | 12/2006 | Backholm et al. |
| 2006/0277271 A1 | 12/2006 | Morse et al. |
| 2006/0294071 A1 | 12/2006 | Weare et al. |
| 2006/0294223 A1 | 12/2006 | Glasgow et al. |
| 2006/0294388 A1 | 12/2006 | Abraham et al. |
| 2007/0005738 A1 | 1/2007 | Alexion-Tiernan et al. |
| 2007/0006317 A1 | 1/2007 | Asami et al. |
| 2007/0011367 A1 | 1/2007 | Scott et al. |
| 2007/0019610 A1 | 1/2007 | Backholm et al. |
| 2007/0021065 A1 | 1/2007 | Sengupta et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0039049 A1 | 2/2007 | Kupferman et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067147 A1 | 3/2007 | Huang |
| 2007/0067381 A1 | 3/2007 | Grant et al. |
| 2007/0067424 A1 | 3/2007 | Raciborski et al. |
| 2007/0070931 A1 | 3/2007 | Lewis et al. |
| 2007/0072617 A1 | 3/2007 | Lewis et al. |
| 2007/0077949 A1 | 4/2007 | Henderson et al. |
| 2007/0078857 A1 | 4/2007 | Punaganti et al. |
| 2007/0078964 A1 | 4/2007 | East et al. |
| 2007/0088852 A1 | 4/2007 | Levkovitz |
| 2007/0100650 A1 | 5/2007 | Ramer et al. |
| 2007/0105627 A1 * | 5/2007 | Campbell ................. 463/40 |
| 2007/0111764 A1 | 5/2007 | Park |
| 2007/0116223 A1 | 5/2007 | Burke et al. |
| 2007/0118620 A1 | 5/2007 | Cartmell et al. |
| 2007/0123214 A1 | 5/2007 | Mock |
| 2007/0130108 A1 | 6/2007 | Simpson et al. |
| 2007/0130217 A1 | 6/2007 | Linyard et al. |
| 2007/0140193 A1 | 6/2007 | Dosa et al. |
| 2007/0147317 A1 | 6/2007 | Smith et al. |
| 2007/0147411 A1 | 6/2007 | Bijwaard et al. |
| 2007/0150881 A1 | 6/2007 | Khawand et al. |
| 2007/0156824 A1 | 7/2007 | Thompson |
| 2007/0156842 A1 | 7/2007 | Vermeulen et al. |
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0192122 A1 | 8/2007 | Routson et al. |
| 2007/0198698 A1 | 8/2007 | Boyd et al. |
| 2007/0220080 A1 | 9/2007 | Humphrey |
| 2007/0220099 A1 | 9/2007 | Di Giorgio et al. |
| 2007/0233855 A1 | 10/2007 | Brown et al. |
| 2007/0237318 A1 | 10/2007 | McGary |
| 2007/0240218 A1 | 10/2007 | Tuvell et al. |
| 2007/0245010 A1 | 10/2007 | Arn et al. |
| 2007/0249365 A1 | 10/2007 | Jendbro |
| 2007/0250591 A1 | 10/2007 | Milic-Frayling et al. |
| 2007/0254631 A1 | 11/2007 | Spooner |
| 2007/0255848 A1 | 11/2007 | Sewall et al. |
| 2007/0264993 A1 | 11/2007 | Hughes |
| 2007/0267492 A1 | 11/2007 | Maclaine Pont |
| 2007/0276925 A1 | 11/2007 | LaJoie et al. |
| 2007/0276926 A1 | 11/2007 | LaJoie et al. |
| 2007/0288469 A1 | 12/2007 | Shenfield |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0293958 A1 | 12/2007 | Stehle et al. |
| 2007/0294295 A1 | 12/2007 | Finkelstein et al. |
| 2007/0294373 A1 | 12/2007 | Harrison |
| 2007/0294763 A1 | 12/2007 | Udezue et al. |
| 2007/0296701 A1 | 12/2007 | Pope et al. |
| 2007/0299918 A1 | 12/2007 | Roberts |
| 2007/0300273 A1 | 12/2007 | Turner |
| 2008/0001717 A1 | 1/2008 | Fiatal |
| 2008/0008095 A1 | 1/2008 | Gilfix |
| 2008/0009344 A1 | 1/2008 | Graham et al. |
| 2008/0016236 A1 | 1/2008 | Beverly et al. |
| 2008/0032718 A1 | 2/2008 | Suresh |
| 2008/0034031 A1 | 2/2008 | Weisbrot et al. |
| 2008/0037787 A1 | 2/2008 | Boynton et al. |
| 2008/0043692 A1 | 2/2008 | Morita |
| 2008/0059308 A1 | 3/2008 | Gerken |
| 2008/0059398 A1 | 3/2008 | Tsutsui |
| 2008/0059582 A1 | 3/2008 | Hartikainen et al. |
| 2008/0061142 A1 | 3/2008 | Howcroft et al. |
| 2008/0068519 A1 | 3/2008 | Adler et al. |
| 2008/0072324 A1 | 3/2008 | Repasi et al. |
| 2008/0077506 A1 * | 3/2008 | Rampell et al. ................. 705/27 |
| 2008/0077571 A1 | 3/2008 | Harris et al. |
| 2008/0085719 A1 | 4/2008 | Kuchibhotla et al. |
| 2008/0085724 A1 | 4/2008 | Cormier et al. |
| 2008/0086379 A1 | 4/2008 | Dion et al. |
| 2008/0091773 A1 | 4/2008 | Hameen-Anttila |
| 2008/0096526 A1 | 4/2008 | Miettinen et al. |
| 2008/0098062 A1 | 4/2008 | Balia |
| 2008/0098120 A1 | 4/2008 | Johnson et al. |
| 2008/0103877 A1 | 5/2008 | Gerken |
| 2008/0104666 A1 | 5/2008 | Dillaway |
| 2008/0108298 A1 | 5/2008 | Selen et al. |
| 2008/0114881 A1 | 5/2008 | Lee et al. |
| 2008/0117922 A1 | 5/2008 | Cockrell et al. |
| 2008/0125225 A1 | 5/2008 | Lazaridis et al. |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0140794 A1 | 6/2008 | Rybak |
| 2008/0148146 A1 | 6/2008 | Estrada et al. |
| 2008/0150704 A1 | 6/2008 | Igoe |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0166999 A1 | 7/2008 | Guedalia et al. |
| 2008/0167019 A1 | 7/2008 | Guedalia et al. |
| 2008/0168145 A1 | 7/2008 | Wilson |
| 2008/0178294 A1 | 7/2008 | Hu et al. |
| 2008/0180228 A1 | 7/2008 | Wakefield et al. |
| 2008/0183800 A1 | 7/2008 | Herzog et al. |
| 2008/0192820 A1 | 8/2008 | Brooks et al. |
| 2008/0195819 A1 | 8/2008 | Dumont |
| 2008/0198995 A1 | 8/2008 | McGary et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0214148 A1 | 9/2008 | Ramer et al. |
| 2008/0216094 A1 | 9/2008 | Anderson et al. |
| 2008/0220797 A1 | 9/2008 | Meiby et al. |
| 2008/0221715 A1 | 9/2008 | Krzyzanowski et al. |
| 2008/0222271 A1 | 9/2008 | Spires |
| 2008/0232290 A1 | 9/2008 | Elzur et al. |
| 2008/0233983 A1 | 9/2008 | Park et al. |
| 2008/0242370 A1 | 10/2008 | Lando et al. |
| 2008/0256090 A1 | 10/2008 | Dietterich et al. |
| 2008/0263170 A1 | 10/2008 | Caron et al. |
| 2008/0270379 A1 | 10/2008 | Ramakrishna |
| 2008/0271123 A1 | 10/2008 | Ollis et al. |
| 2008/0273498 A1 | 11/2008 | Jalil et al. |
| 2008/0281798 A1 | 11/2008 | Chatterjee et al. |
| 2008/0288659 A1 | 11/2008 | Hasha et al. |
| 2008/0298386 A1 | 12/2008 | Fiatal |
| 2008/0299956 A1 | 12/2008 | Bailey et al. |
| 2008/0301231 A1 | 12/2008 | Mehta et al. |

| Publication No. | Date | Inventor |
|---|---|---|
| 2008/0301300 A1 | 12/2008 | Toub |
| 2008/0313282 A1 | 12/2008 | Warila et al. |
| 2008/0320577 A1 | 12/2008 | Larduinat |
| 2009/0006116 A1 | 1/2009 | Baker et al. |
| 2009/0010204 A1 | 1/2009 | Pratt, Jr. et al. |
| 2009/0010259 A1 | 1/2009 | Sirotkin |
| 2009/0012841 A1 | 1/2009 | Saft et al. |
| 2009/0016526 A1 | 1/2009 | Fiatal et al. |
| 2009/0019141 A1 | 1/2009 | Bush et al. |
| 2009/0019485 A1 | 1/2009 | Ellis et al. |
| 2009/0019532 A1 | 1/2009 | Jacobsen et al. |
| 2009/0024794 A1 | 1/2009 | Iyer et al. |
| 2009/0027222 A1 | 1/2009 | Larsson et al. |
| 2009/0031006 A1 | 1/2009 | Johnson |
| 2009/0049482 A1 | 2/2009 | Auerbach et al. |
| 2009/0052372 A1 | 2/2009 | Durazzo et al. |
| 2009/0054034 A1 | 2/2009 | Backholm et al. |
| 2009/0055353 A1 | 2/2009 | Meema |
| 2009/0059950 A1 | 3/2009 | Gao et al. |
| 2009/0063647 A1 | 3/2009 | Backholm et al. |
| 2009/0070526 A1 | 3/2009 | Tetrick et al. |
| 2009/0075683 A1 | 3/2009 | Backholm et al. |
| 2009/0077263 A1 | 3/2009 | Koganti et al. |
| 2009/0077326 A1 | 3/2009 | Motohashi |
| 2009/0081944 A1 | 3/2009 | Yavuz et al. |
| 2009/0094317 A1 | 4/2009 | Venkitaraman |
| 2009/0100416 A1 | 4/2009 | Brown et al. |
| 2009/0110179 A1 | 4/2009 | Elsey et al. |
| 2009/0119266 A1 | 5/2009 | Fitzpatrick et al. |
| 2009/0122772 A1 | 5/2009 | Jung |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R et al. |
| 2009/0164560 A1 | 6/2009 | Fiatal |
| 2009/0165115 A1 | 6/2009 | Toumura et al. |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0215504 A1 | 8/2009 | Lando |
| 2009/0221326 A1 | 9/2009 | Roussel et al. |
| 2009/0228545 A1 | 9/2009 | Mendez et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0248878 A1 | 10/2009 | Tran et al. |
| 2009/0249482 A1 | 10/2009 | Sarathy |
| 2009/0252136 A1 | 10/2009 | Mahany et al. |
| 2009/0254589 A1 | 10/2009 | Nair et al. |
| 2009/0254971 A1 | 10/2009 | Herz et al. |
| 2009/0264138 A1 | 10/2009 | Kang et al. |
| 2009/0282125 A1 | 11/2009 | Jeide et al. |
| 2009/0282130 A1 | 11/2009 | Antoniou et al. |
| 2009/0286531 A1 | 11/2009 | Bhatt et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2009/0327390 A1 | 12/2009 | Tran et al. |
| 2010/0010993 A1 | 1/2010 | Hussey, Jr. et al. |
| 2010/0042691 A1 | 2/2010 | Maguire |
| 2010/0049872 A1 | 2/2010 | Roskind |
| 2010/0057924 A1 | 3/2010 | Rauber et al. |
| 2010/0067413 A1 | 3/2010 | Schneider et al. |
| 2010/0069127 A1 | 3/2010 | Fiennes |
| 2010/0077035 A1 | 3/2010 | Li et al. |
| 2010/0077083 A1 | 3/2010 | Tran et al. |
| 2010/0082811 A1 | 4/2010 | Van Der Merwe et al. |
| 2010/0083255 A1 | 4/2010 | Bane et al. |
| 2010/0087167 A1 | 4/2010 | Tsurutome et al. |
| 2010/0088722 A1 | 4/2010 | Jiang |
| 2010/0093273 A1 | 4/2010 | Hohl |
| 2010/0115050 A1 | 5/2010 | Sultenfuss et al. |
| 2010/0118190 A1 | 5/2010 | Salfati et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0149975 A1 | 6/2010 | Tripathi et al. |
| 2010/0174735 A1 | 7/2010 | Fiatal |
| 2010/0174939 A1 | 7/2010 | Vexler |
| 2010/0186011 A1 | 7/2010 | Magenheimer |
| 2010/0192212 A1 | 7/2010 | Raleigh |
| 2010/0203876 A1 | 8/2010 | Krishnaswamy |
| 2010/0207870 A1 | 8/2010 | Cho |
| 2010/0211651 A1 | 8/2010 | Guedalia et al. |
| 2010/0212010 A1 | 8/2010 | Stringer et al. |
| 2010/0214984 A1 | 8/2010 | Cho et al. |
| 2010/0227594 A1 | 9/2010 | De Vries |
| 2010/0228863 A1 | 9/2010 | Kawauchi |
| 2010/0229096 A1 | 9/2010 | Maiocco et al. |
| 2010/0238915 A1 | 9/2010 | Cayla et al. |
| 2010/0250706 A1 | 9/2010 | Burckart et al. |
| 2010/0250733 A1 | 9/2010 | Turanyi et al. |
| 2010/0250986 A1 | 9/2010 | Black et al. |
| 2010/0251366 A1 | 9/2010 | Baldry |
| 2010/0257580 A1 | 10/2010 | Zhao |
| 2010/0260038 A1 | 10/2010 | Dhodapkar et al. |
| 2010/0268757 A1 | 10/2010 | Fisher |
| 2010/0274983 A1 | 10/2010 | Murphy et al. |
| 2010/0279662 A1 | 11/2010 | Kuusinen et al. |
| 2010/0293335 A1 | 11/2010 | Muthiah et al. |
| 2010/0299223 A1 | 11/2010 | Crouch |
| 2010/0299518 A1 | 11/2010 | Viswanathan et al. |
| 2010/0313018 A1 | 12/2010 | Jorgensen |
| 2010/0315535 A1 | 12/2010 | Nurit et al. |
| 2010/0319054 A1 | 12/2010 | Mehta et al. |
| 2010/0322124 A1 | 12/2010 | Luoma et al. |
| 2010/0323664 A1 | 12/2010 | Sivaram et al. |
| 2010/0325306 A1 | 12/2010 | Vimpari et al. |
| 2011/0028129 A1 | 2/2011 | Hutchison et al. |
| 2011/0035799 A1 | 2/2011 | Handler |
| 2011/0040718 A1 | 2/2011 | Tendjoukian et al. |
| 2011/0044304 A1 | 2/2011 | Connelly et al. |
| 2011/0065419 A1 | 3/2011 | Book et al. |
| 2011/0065424 A1 | 3/2011 | Estevez et al. |
| 2011/0066646 A1 | 3/2011 | Danado et al. |
| 2011/0083186 A1 | 4/2011 | Niemela et al. |
| 2011/0099363 A1 | 4/2011 | Boynton et al. |
| 2011/0113109 A1 | 5/2011 | LeVasseur et al. |
| 2011/0119134 A1 | 5/2011 | Zivkovic et al. |
| 2011/0126060 A1 | 5/2011 | Grube et al. |
| 2011/0126250 A1 | 5/2011 | Turner |
| 2011/0138102 A1 | 6/2011 | Glikson et al. |
| 2011/0138402 A1 | 6/2011 | Fleming |
| 2011/0151944 A1 | 6/2011 | Morgan |
| 2011/0153816 A1 | 6/2011 | Lloyd et al. |
| 2011/0153937 A1 | 6/2011 | Annamalaisami et al. |
| 2011/0158239 A1 | 6/2011 | Mohaban |
| 2011/0165889 A1 | 7/2011 | Fiatal et al. |
| 2011/0177847 A1 | 7/2011 | Huang |
| 2011/0179138 A1 | 7/2011 | Van Geest et al. |
| 2011/0179377 A1 | 7/2011 | Fleming |
| 2011/0182220 A1 | 7/2011 | Black et al. |
| 2011/0184827 A1 | 7/2011 | Hubert |
| 2011/0185355 A1 | 7/2011 | Chawla et al. |
| 2011/0189997 A1 | 8/2011 | Tiwari et al. |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0214182 A1 | 9/2011 | Adams et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |

| | | | |
|---|---|---|---|
| 2011/0264731 A1 | 10/2011 | Knowles et al. | |
| 2011/0294463 A1 | 12/2011 | Fiatal | |
| 2011/0294464 A1 | 12/2011 | Fiatal | |
| 2011/0296050 A1 | 12/2011 | Cherukuri | |
| 2011/0296120 A1 | 12/2011 | Khan | |
| 2011/0296415 A1 | 12/2011 | Khan et al. | |
| 2011/0302154 A1 | 12/2011 | Snyder | |
| 2012/0005276 A1 | 1/2012 | Guo et al. | |
| 2012/0008536 A1 | 1/2012 | Tervahauta et al. | |
| 2012/0022980 A1 | 1/2012 | Angelone | |
| 2012/0023190 A1 | 1/2012 | Backholm et al. | |
| 2012/0023226 A1 | 1/2012 | Petersen et al. | |
| 2012/0023236 A1 | 1/2012 | Backholm et al. | |
| 2012/0030280 A1 | 2/2012 | Wang et al. | |
| 2012/0030750 A1 | 2/2012 | Bhargava et al. | |
| 2012/0054386 A1 | 3/2012 | Hanes | |
| 2012/0072910 A1 | 3/2012 | Martin et al. | |
| 2012/0078725 A1 | 3/2012 | Maitra et al. | |
| 2012/0078996 A1 | 3/2012 | Shah | |
| 2012/0096092 A1 | 4/2012 | Davidge et al. | |
| 2012/0099592 A1 | 4/2012 | Ludwig | |
| 2012/0108225 A1 | 5/2012 | Luna et al. | |
| 2012/0110109 A1 | 5/2012 | Luna et al. | |
| 2012/0110110 A1 | 5/2012 | Luna et al. | |
| 2012/0110111 A1 | 5/2012 | Luna et al. | |
| 2012/0110112 A1 | 5/2012 | Luna et al. | |
| 2012/0110118 A1 | 5/2012 | Luna et al. | |
| 2012/0110171 A1 | 5/2012 | Luna et al. | |
| 2012/0110173 A1 | 5/2012 | Luna et al. | |
| 2012/0110174 A1 | 5/2012 | Wootton et al. | |
| 2012/0110275 A1 | 5/2012 | Ganti et al. | |
| 2012/0130973 A1 | 5/2012 | Tamm et al. | |
| 2012/0131095 A1 | 5/2012 | Luna et al. | |
| 2012/0131184 A1 | 5/2012 | Luna et al. | |
| 2012/0135726 A1 | 5/2012 | Luna et al. | |
| 2012/0140750 A1 | 6/2012 | Yan et al. | |
| 2012/0149352 A1 | 6/2012 | Backholm et al. | |
| 2012/0151044 A1 | 6/2012 | Luna et al. | |
| 2012/0157170 A1 | 6/2012 | Backholm et al. | |
| 2012/0158837 A1 | 6/2012 | Kaul | |
| 2012/0158908 A1 | 6/2012 | Luna et al. | |
| 2012/0170496 A1 | 7/2012 | Yang et al. | |
| 2012/0170569 A1 | 7/2012 | Al-Khudairi | |
| 2012/0173616 A1 | 7/2012 | Luna et al. | |
| 2012/0174220 A1 | 7/2012 | Rodriguez | |
| 2012/0176968 A1 | 7/2012 | Luna | |
| 2012/0178414 A1 | 7/2012 | Fiatal | |
| 2012/0179801 A1 | 7/2012 | Luna et al. | |
| 2012/0185597 A1 | 7/2012 | Luna | |
| 2012/0185918 A1 | 7/2012 | Backholm et al. | |
| 2012/0210121 A1 | 8/2012 | Boynton et al. | |
| 2012/0226767 A1 | 9/2012 | Luna et al. | |
| 2012/0227059 A1 | 9/2012 | Fleming | |
| 2012/0246333 A1 | 9/2012 | Fiatal | |
| 2012/0254417 A1 | 10/2012 | Luna | |
| 2012/0271903 A1 | 10/2012 | Luna | |
| 2012/0271908 A1 | 10/2012 | Luna et al. | |
| 2012/0278431 A1 | 11/2012 | Luna | |
| 2012/0278432 A1 | 11/2012 | Luna | |
| 2012/0278464 A1 | 11/2012 | Lehane et al. | |
| 2012/0278886 A1 | 11/2012 | Luna | |
| 2012/0284356 A1 | 11/2012 | Luna | |
| 2012/0289239 A1 | 11/2012 | Luna et al. | |
| 2012/0290675 A1 | 11/2012 | Luna et al. | |
| 2012/0290717 A1 | 11/2012 | Luna | |
| 2012/0304288 A1 | 11/2012 | Wright et al. | |
| 2012/0317370 A1 | 12/2012 | Luna | |
| 2012/0331059 A1 | 12/2012 | Luna | |
| 2012/0331087 A1 | 12/2012 | Luna et al. | |
| 2013/0010693 A1 | 1/2013 | Luna et al. | |
| 2013/0012180 A1 | 1/2013 | Backholm et al. | |
| 2013/0031191 A1 | 1/2013 | Bott | |
| 2013/0031599 A1 | 1/2013 | Luna et al. | |
| 2013/0031600 A1 | 1/2013 | Luna et al. | |
| 2013/0031601 A1 | 1/2013 | Bott | |
| 2013/0041974 A1 | 2/2013 | Luna et al. | |

FOREIGN PATENT DOCUMENTS

| | | |
|---|---|---|
| EP | 1278390 A1 | 1/2003 |
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1483689 A1 | 12/2004 |
| EP | 1815634 A1 | 8/2007 |
| EP | 1815652 A1 | 8/2007 |
| EP | 1817883 A1 | 8/2007 |
| EP | 2267968 A1 | 6/2010 |
| EP | 2465275 A2 | 6/2012 |
| EP | 2503473 A1 | 9/2012 |
| FI | 117152 B | 6/2006 |
| FI | 118288 B | 9/2007 |
| FI | 119581 B | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 T | 5/2005 |
| JP | 2009-207177 A | 9/2009 |
| JP | 4386732 B2 | 10/2009 |
| KR | 2001-0018568 A | 3/2001 |
| KR | 2006-0068186 A | 6/2006 |
| KR | 2007-0071858 A1 | 7/2007 |
| KR | 10-0765238 B1 | 10/2007 |
| KR | 2007-0102091 A1 | 10/2007 |
| KR | 2007-0117874 A | 12/2007 |
| KR | 2009-0038217 A | 4/2009 |
| KR | 2009-0077515 A | 7/2009 |
| KR | 2010-0064605 A | 6/2010 |
| WO | WO 97/41661 A2 | 11/1997 |
| WO | WO 98/24257 A1 | 6/1998 |
| WO | WO 98/58322 A2 | 12/1998 |
| WO | WO 01/30130 A2 | 5/2001 |
| WO | WO 03/007570 A1 | 1/2003 |
| WO | WO 03/058483 A1 | 7/2003 |
| WO | WO 03/058879 A1 | 7/2003 |
| WO | WO 03/065701 A1 | 8/2003 |
| WO | WO 03/098890 A1 | 11/2003 |
| WO | WO 2004/017591 A2 | 2/2004 |
| WO | WO 2004/045171 A1 | 5/2004 |
| WO | WO 2005/015925 A2 | 2/2005 |
| WO | WO 2005/020108 A1 | 3/2005 |
| WO | WO 2006/045005 A2 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2007/015725 A2 | 2/2007 |
| WO | WO 2007/015726 A1 | 2/2007 |
| WO | WO 2007/069245 A2 | 6/2007 |
| WO | WO 2007/073422 A1 | 6/2007 |
| WO | WO 2007/127878 A1 | 11/2007 |
| WO | WO 2007/149526 A2 | 12/2007 |
| WO | WO 2007/149540 A2 | 12/2007 |
| WO | WO 2008061042 A2 | 5/2008 |
| WO | WO 2009/132700 A1 | 11/2009 |
| WO | WO 2010/068842 A1 | 6/2010 |
| WO | WO 2011/126889 A2 | 10/2011 |
| WO | WO 2012/018430 A1 | 2/2012 |
| WO | WO 2012/018431 A1 | 2/2012 |
| WO | WO 2012/018477 A2 | 2/2012 |
| WO | WO 2012/018479 A2 | 2/2012 |
| WO | WO 2012/018556 A2 | 2/2012 |
| WO | WO 2012/024030 A2 | 2/2012 |
| WO | WO 2012/060995 A2 | 5/2012 |
| WO | WO 2012/060996 A2 | 5/2012 |
| WO | WO 2012/060997 A2 | 5/2012 |
| WO | WO 2012/061430 A2 | 5/2012 |
| WO | WO 2012/061433 A2 | 5/2012 |
| WO | WO 2012/061437 A1 | 5/2012 |
| WO | WO 2012/071283 A1 | 5/2012 |
| WO | WO 2012/071384 A2 | 5/2012 |
| WO | WO 2012/094675 A2 | 7/2012 |
| WO | WO 2012/117157 A1 | 9/2012 |
| WO | WO 2012/145533 A2 | 10/2012 |

| | | |
|---|---|---|
| WO | WO 2012/145541 A2 | 10/2012 |
| WO | WO 2012/149216 A2 | 11/2012 |
| WO | WO 2012/149434 A2 | 11/2012 |
| WO | WO 2012/161751 A1 | 11/2012 |
| WO | WO 2013/015835 A1 | 1/2013 |
| WO | WO 2013/015994 A1 | 1/2013 |
| WO | WO 2013/015995 A1 | 1/2013 |
| WO | WO 2013/016663 A2 | 1/2013 |
| WO | WO 2013/016666 A2 | 1/2013 |

OTHER PUBLICATIONS

Amato, Guiseppe et al., "Detection of Images With Adult Content for Parental Control on Mobile Devices," Mobility, 5 pages, 2009+A182.
Blefari-Melazzi, N. et al., "Autonomic Control and Personalization of a Wireless Access Network," Computer Networks, vol. 51, pp. 2645-2676, 2007.
de la Iglesia, Didac Gil et al., "Enhancing Mobile Learning Activities by the Use of Mobile Virtual Devices—Some Design and Implementation Issues," 2010 International Conference on Intelligent Networking and Collaborative Systems, IEEE Computer Society, pp. 137-144, 2010.
Eronen, "TCP Wake-Up: Reducing Keep-Alive Traffic in Mobile IPv4 and Ipsec NAT Traversal," NRC-TR-2008-002, Nokia, 10 pages, Jan. 31, 2008.
Fukushima, Yukinobu et al., "Planning Method of Robust WDM Networks Against Traffic Changes," IEIC Technical Report, vol. 103, No. 1, pp. 11-16, 2003.
International Application No. PCT/US2011/061795, International Search Report & Written Opinion, 10 pages, Jul. 31, 2012.
International Application No. PCT/US2012/020669, International Search Report & Written Opinion, 10 pages, Sep. 12, 2012.
International Application No. PCT/US2012/034288, International Search Report & Written Opinion, 15 pages, Nov. 23, 2012.
International Application No. PCT/US2012/034297, International Search Report & Written Opinion, 11 pages, Nov. 26, 2012.
International Application No. PCT/US2012/034300, International Search Report & Written Opinion, 9 pages, Nov. 23, 2012.
International Application No. PCT/US2012/035292, International Search Report & Written Opinion, 11 pages, Nov. 28, 2012.
International Application No. PCT/US2012/035300, International Search Report & Written Opinion, 9 pages, Nov. 28, 2012.
International Application No. PCT/US2012/035608, International Search Report & Written Opinion, 9 pages, Nov. 28, 2012.
International Application No. PCT/US2012/035617, International Search Report & Written Opinion, 9 pages, Oct. 10, 2012.
International Application No. PCT/US2012/042982, International Search Report & Written Opinion, 11 pages, Jan. 2, 2013.
International Application No. PCT/US2012/046317, International Search Report & Written Opinion, 10 pages, Jan. 3, 2013.
International Application No. PCT/US2012/046321, International Search Report & Written Opinion, 11 pages, Dec. 27, 2012.
International Application No. PCT/US2012/048623, International Search Report & Written Opinion, 13 pages, Jan. 31, 2013.
International Application No. PCT/US2012/048639, International Search Report & Written Opinion, 15 pages, Jan. 29, 2013.
International Application No. PCT/US2012/055934, International Search Report & Written Opinion, 12 pages, Jan. 31, 2013.
Johnsen, Lotte, Master's Thesis for "Content Distribution in Ad Hoc Networks," Norwegian University of Science and Technology, Department of Telematics, 158 pages, Spring 2006.
Kanter, Theo et al., "Smart Delivery of Multimedia Content for Wireless Applications," Computer Science, vol. 1818, pp. 70-81, 2000.
Kino, Toru, "Infrastructure Technology for Cloud Services," Fujitsu Sci. Tech. J., vol. 47, No. 4, pp. 434-442, Oct. 2011.
LeBrun, Jason et al., "Bluetooth Content Distribution Stations on Public Transit," ACM, 3 pages, 2006.
Newton, Harry, "Newton's Telecom Dictionary," 20th Edition, pp. 67, 127, 542, Mar. 2004.
Open Mobile Alliance Ltd., "OMA AOI Architecture Principles—OMA-CD-AOI-2012-0012," 12 pages, Dec. 17, 2012.
Openet Telecom, "Taming Signaling: Addressing the Signaling Storm," Openet Labs Technical White Paper, 11 pages, 2012.
Parker, Tammy, "SK Telecom Aims to License, Standardize Smart Push," FierceBroadbandWireless, 4 pages, Aug. 26, 2012.
Paul, Sanjoy et al., "The Cache-And-Forward Network Architecture for Efficient Mobile Content Delivery Services in the Future Internet," First ITU-T Kaleidoscope Academic Conference for Innovations in NGN—Future Network and Services, 7 pages, May 12-13, 2008.
Qualcomm Incorporated, "A 3G/LTE Wi-Fi Offload Framework: Connectivity Engine (CnE) to Manage Inter-System Radio Connections and Applications," 15 pages, Jun. 2011.
U.K. Patent Application No. GB1219986.5, Examination Report, 6 pages, Dec. 24, 2012.
Zhang, Qi et al., "Cloud Computing: State-Of-The-Art and Research Challenges," J Internet Serv Appl, vol. 1, pp. 7-18, 2010.
Allchin, James Edward, "An Architecture for Reliable Decentralized Systems," Ph.D. Thesis, Georgia Institute of Technology, 185 pages, Sep. 1983.
Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Application and Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report May 2, 2004, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.

GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 page, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/044974, International Search Report, 15 pages, Jun. 1, 2012.
International Application No. PCT/US2011/056474, International Search Report, 9 pages, May 4, 2012.
International Application No. PCT/US2011/056476, International Search Report, 12 pages, May 24, 2012.
International Application No. PCT/US2011/056478, International Search Report, 11 pages, May 31, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/021459, International Search Report, 10 pages, Jun. 1, 2012.
International Application No. PCT/US2012/022121, International Search Report, 11 pages, May 14, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.
Komblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.

Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet As Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Phillips, Joshua et al., "Modeling the Intelligence Analysis Process for Intelligent User Agent Development," Research and Practice in Human Resource Management, vol. 9, No. 1, pp. 59-73, 2001.

Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Ringel, Meredith et al., "iStuff: A Scalable Architecture for Lightweight, Wireless Devices for Ubicomp User Interfaces," Proceedings of UbiComp 2002, 2 pages, 2002.
Seven Networks, Inc., "Seven Optimizing the Mobile Ecosystem," www.seven.com/products.traffic_optimization.php, 1 pages, May 29, 2012.
Shafran, Andrew Bryce, "Easy Lotus Notes® for Windows™," Que Corporation, 199 pages, 1994.
Signorini, Eugene, "SEVEN's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adrian et al., "Profiling and Matchmaking Strategies in Support of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wikipedia, Definition for "General Packet Radio Service," 7 pages, downloaded on May 31, 2012.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.
U.S. Appl. No. 61/570,703, filed Dec. 14, 2011, Operational Modes for Mobile Traffic Optimization and Concurrent Management of Optimized and Non-Optimized Traffic.
U.S. Appl. No. 13/715,900, filed Dec. 14, 2012, Operational Modes for Mobile Traffic Optimization and Concurrent Management of Optimized and Non-Optimized Traffic.
U.S. Appl. No. 13/467,159, May 9, 2012, Selective Data Compression by a Distributed Traffic Management System to Reduce Mobile Data Traffic and Signaling Traffic.
U.S. Appl. No. 60/346,881, filed Jan. 8, 2002, Method and System for Mobile Data Communications.
U.S. Appl. No. 11/470,802, filed Sep. 7, 2006, Connection Architecture for a Mobile Network.
U.S. Appl. No. 13/101,775, filed May 5, 2011, Mobile Device Power Management in Data Synchronization Over a Mobile Network With or Without a Trigger Notification.
U.S. Appl. No. 60/403,249, filed Aug. 12, 2002, Mobile Data Services.
U.S. Appl. No. 13/396,464, Feb. 14, 2012, Secure End-To-End Transport Through Intermediary Nodes.
U.S. Appl. No. 60/620,889, filed Oct. 20, 2004, Method And Apparatus For Communication Interception.
U.S. Appl. No. 13/423,112, filed Mar. 16, 2012, Method And Apparatus For Intercepting Events In A Communication System.
U.S. Appl. No. 60/620,961, filed Oct. 20, 2004, Method and Apparatus for Event Based Billing.
U.S. Appl. No. 13/096,239, filed Apr. 28, 2011, System and Method for Tracking Billing Events in a Mobile Wireless Network for a Network Operator.
U.S. Appl. No. 60/650,975, filed Feb. 9, 2005, E-Mail Messaging To/From a Mobile Terminal.
U.S. Appl. No. 60/651,082, filed Feb. 9, 2005, Data Security in a Mobile E-Mail Service.
U.S. Appl. No. 12/205,747, filed Sep. 5, 2008, Maintaining Mobile Terminal Information for Secure E-Mail Communications.
U.S. Appl. No. 12/228,325, filed Aug. 11, 2008, Messaging Centre for Forwarding E-Mail.
U.S. Appl. No. 60/651,081, filed Feb. 9, 2005, Provisioning of E-Mail Settings for a Mobile Terminal.
U.S. Appl. No. 13/349,220, filed Jan. 12, 2012, Provisioning of E-Mail Settings for a Mobile Terminal.
U.S. Appl. No. 60/661,757, filed Mar. 14, 2005, Agnostic User Interface for use in Mobile Devices.
U.S. Appl. No. 12/970,452, filed Dec. 16, 2010, Intelligent Rendering of Information in a Limited Display Environment.
U.S. Appl. No. 13/474,508, filed May 17, 2012, System and Method for Executing Commands That Are Non Native to the Native Environment of a Mobile Device.
U.S. Appl. No. 60/704,781, filed Aug. 1, 2005, Networked Personal Information Management.
U.S. Appl. No. 11/925,959, filed Oct. 28, 2007, Data Aggregation and Access.
U.S. Appl. No. 11/925,988, filed Oct. 28, 2007, Sharing of Data Utilizing Push Functionality and Privacy Settings.
U.S. Appl. No. 11/925,992, filed Oct. 28, 2007, Extending User Relationships.
U.S. Appl. No. 11/303,048, filed Dec. 14, 2005, Publishing Data in an Information Community.
U.S. Appl. No. 13/030,023, filed Feb. 17, 2011, Targeted Notification of Content Availability to a Mobile Device.
U.S. Appl. No. 60/805,301, filed Jun. 20, 2006, Communication and Content Sharing Access Social Networks.
U.S. Appl. No. 12/848,585, filed Aug. 2, 2010, Location-Based Operations and Messaging.
U.S. Appl. No. 11/701,590, filed Feb. 2, 2007, Systems and Methods for Group Messaging.
U.S. Appl. No. 11/729,314, filed Mar. 27, 2007, Systems and Method for Group Management.
U.S. Appl. No. 60/941,632, filed Jun. 1, 2007, Polling.
U.S. Appl. No. 12/080,247, filed Mar. 31, 2008, Polling.
U.S. Appl. No. 60/062,797, filed Jan. 28, 2008, Systems and Methods for Data Transport.
U.S. Appl. No. 12/080,216, filed Mar. 31, 2008, Reducing Network and Battery Consumption During Content Delivery to a Mobile Device.
U.S. Appl. No. 13/489,855, filed Jun. 6, 2012, Reducing Network and Battery Consumption During Content Delivery and Playback.
U.S. Appl. No. 12/361,538, filed Jan. 28, 2009, System and Method for Data Transport.
U.S. Appl. No. 13/158,706, filed Jun. 13, 2011, System and Method for Facilitating Mobile Traffic in a Mobile Network.
U.S. Appl. No. 12/361,434, filed Jan. 28, 2009, Web-Based Access to Data Objects.
U.S. Appl. No. 13/086,207, filed Apr. 13, 2011, System and Method of a Relay Server for Managing Communications and Notification Between a Mobile Device and Application Server.
U.S. Appl. No. 12/361,520, filed Jan. 28, 2009, Integrated Messaging.
U.S. Appl. No. 13/083,278, filed Apr. 8, 2011, Integrated Messaging.
U.S. Appl. No. 61/104,674, filed Oct. 10, 2008, Bandwidth Measurement.
U.S. Appl. No. 12/577,213, filed Oct. 12, 2009, Bandwidth Measurement.
U.S. Appl. No. 11/640,629, filed Dec. 18, 2006, Flexible Real-Time Access.
U.S. Appl. No. 13/614,583, filed Sep. 13, 2012, Flexible Real-Time Inbox Access.
U.S. Appl. No. 13/735,811, filed Jan. 7, 2013, Electronic-Mail Filtering for Mobile Devices.
U.S. Appl. No. 12/002,300, filed Dec. 13, 2007, Content Delivery to a Mobile Device From a Content Service.
U.S. Appl. No. 13/208,200, filed Aug. 11, 2011, System and Method for Providing a Network Service in a Distributed Fashion to a Mobile.
U.S. Appl. No. 13/208,185, filed Aug. 11, 2011, Mobile Virtual Network Operator.
U.S. Appl. No. 13/427,748, filed Mar. 22, 2012, System and Method for Providing a Network Service in a Distributed Fashion to a Mobile Device.

U.S. Appl. No. 12/011,396, filed Jan. 25, 2008, Policy Based Content Service.
U.S. Appl. No. 13/168,067, filed Jun. 24, 2011, System for Providing Policy Based Content Service in a Mobile Network.
U.S. Appl. No. 12/080,142, filed Mar. 31, 2008, Content Search Engine.
U.S. Appl. No. 12/141,871, filed Jun. 18, 2008, Application Discovery on Mobile Devices.
U.S. Appl. No. 13/312,664, filed Dec. 6, 2011, Provisioning Applications for a Mobile Device.
U.S. Appl. No. 12/348,136, filed Jan. 2, 2009, Predictive Content Delivery.
U.S. Appl. No. 61/367,871, filed Jul. 26, 2010, Conserving Power Consumption in Applications With Network Initiated Data Transfer.
U.S. Appl. No. 13/178,598, filed Jul. 8, 2011, Context Aware Traffic Management for Resource Conservation in a Wireless Network.
U.S. Appl. No. 13/407,406, filed Feb. 28, 2012, System and Method for Conserving Battery Consumption on a Mobile Device.
U.S. Appl. No. 13/477,625, filed May 22, 2012, Mobile Device Radio Use Optimization by Batching Low Priority Requests.
U.S. Appl. No. 61/367,870, filed Jul. 26, 2010, Managing and Improving Network Resource Utilization, Performance and Optimizing Traffic in Wire Line and Wireless Network With Mobile Clients.
U.S. Appl. No. 13/188,553, filed Jul. 22, 2011, Mobile Application Traffic Optimization.
U.S. Appl. No. 13/351,176, filed Jan. 16, 2012, Mobile Application Traffic Optimization.
U.S. Appl. No. 61/408,858, filed Nov. 1, 2010, Cross Application Traffic Coordination.
U.S. Appl. No. 13/115,631, filed May 25, 2011, Mobile Network Traffic Coordination Across Multiple Applications.
U.S. Appl. No. 13/355,443, filed Jan. 20, 2012, Mobile Network Traffic Coordination Across Multiple Applications.
U.S. Appl. No. 61/408,839, filed Nov. 1, 2010, Activity Session as Method of Optimizing Network Resource Use.
U.S. Appl. No. 13/115,740, filed May 25, 2011, Prediction of Activity Session for Mobile Network Use Optimization and User Experience Enhancement.
U.S. Appl. No. 61/408,829, filed Nov. 1, 2010, Distributed Policy Management.
U.S. Appl. No. 13/178,675, filed Jul. 8, 2011, Distributed Implementation of Dynamic Wireless Traffic Policy.
U.S. Appl. No. 61/408,846, filed Nov. 1, 2010, Intelligent Cache Management in Congested Wireless Networks.
U.S. Appl. No. 13/176,537, filed Jul. 5, 2011, Distributed Caching for Research and Mobile Network Traffic Management.
U.S. Appl. No. 61/408,854, filed Nov. 1, 2010, Intelligent Management of Non-Cachable Content in Wireless Networks.
U.S. Appl. No. 61/532,857, filed Sep. 9, 2011, Cache Defeat Detection and Caching of Content Addressed by Identifiers Intended to Defeat Cache.
U.S. Appl. No. 13/474,561, filed May 17, 2012, Cache Defeat Detection and Caching of Content Addressed by Identifiers Intended to Defeat Cache.
U.S. Appl. No. 61/408,826, filed Nov. 1, 2010, One Way Intelligent Heartbeat.
U.S. Appl. No. 13/604,404, filed Sep. 5, 2012, Timing of Keep-Alive Messages Used in a System for Mobile Network Resource Conservation and Optimization.
U.S. Appl. No. 61/408,820, filed Nov. 1, 2010, Traffic Categorization and Policy Driving Radio State.
U.S. Appl. No. 13/287,058, filed Nov. 1, 2011, Mobile Traffic Categorization and Policy for Network Use Optimization While Preserving User Experience.
U.S. Appl. No. 61/416,020, filed Nov. 22, 2010, Aligning Bursts from Server to Client.
U.S. Appl. No. 13/300,267, filed Nov. 18, 2011, Aligning Data Transfer to Optimize Connections Established for Transmission Over a Wireless Network.
U.S. Appl. No. 13/407,582, filed Feb. 28, 2012, Mobile Network Background Traffic Data Management With Optimized Polling Intervals.

U.S. Appl. No. 13/618,371, filed Sep. 14, 2012, Mobile Network Background Traffic Data Management With Optimized Polling Intervals.
U.S. Appl. No. 61/416,033, filed Nov. 22, 2010, Polling Interval Functions.
U.S. Appl. No. 13/301,864, filed Nov. 22, 2011, Optimization of Resource Polling Intervals to Satisfy Mobile Device Requests.
U.S. Appl. No. 61/430,828, filed Jan. 7, 2011, Domain Name System With Network Traffic Harmonization.
U.S. Appl. No. 13/346,627, filed Jan. 9, 2012, System and Method for Reduction of Mobile Network Traffic Used for Domain Name System (DNS) Queries.
U.S. Appl. No. 61/476,976, filed Apr. 19, 2011, Virtual Memory, Shared Memory Management and Social Caching Based on Geo-Location in a Networked Environment.
U.S. Appl. No. 13/451,327, filed Apr. 19, 2012, Shared Resource and Virtual Resource Management in a Networked Environment.
U.S. Appl. No. 13/605,475, filed Sep. 6, 2012, Wireless Sharing of Device Resources Allowing Device Storage Needs to Be Wirelessly Offloaded to Other Devices.
U.S. Appl. No. 13/740,785, filed Jan. 14, 2013, System and Method for a Mobile Device to Use Physical Storage of Another Device for Caching.
U.S. Appl. No. 13/451,361, filed Apr. 19, 2012, Device Resources Sharing for Network Resource Conservation.
U.S. Appl. No. 61/479,676, filed Apr. 27, 2011, Atomic Process for Offloading Mobile Application Activity by Traffic Snooping.
U.S. Appl. No. 13/457,335, filed Apr. 26, 2012, Mobile Device Which Offloads Requests Made by a Mobile Application to a Remote Entity for Conservation of Mobile Device and Network Resources and Methods Therefor.
U.S. Appl. No. 13/457,368, filed Apr. 26, 2012, System and Method for Making Requests on Behalf of a Mobile Device Based on Atomic Processes for Mobile Traffic Relief.
U.S. Appl. No. 61/479,722, filed Apr. 27, 2011, Detecting and Preserving State for Satisfying Application Requests in a Distributed Proxy and Cache System.
U.S. Appl. No. 13/458,797, filed Apr. 27, 2012, Detecting and Preserving State for Satisfying Application Requests in a Distributed Proxy and Cache System.
U.S. Appl. No. 13/592,233, filed Aug. 22, 2012, Cache State Management on a Mobile Device to Preserve User Experience.
U.S. Appl. No. 61/594,529, filed Feb. 3, 2012, User as an End Point for Profiling and Optimizing the Delivery of Content in a Wireless Network.
U.S. Appl. No. 13/758,842, filed Feb. 4, 2013, User as an End Point for Profiling and Optimizing the Delivery of Content in a Wireless Network.
U.S. Appl. No. 61/594,237, filed Feb. 2, 2012, Dynamic Black White, Grey Listing.
U.S. Appl. No. 13/758,906, filed Feb. 4, 2013, Dynamic Categorization of Applications for Network Access in a Mobile Network.
U.S. Appl. No. 61/479,701, filed Apr. 27, 2011, Detection and Filtering of Malware Based on Traffic Observations Made in a Distributed Mobile Traffic Management System.
U.S. Appl. No. 13/458,844, filed Apr. 27, 2012, Detection and Filtering of Malware Based on Traffic Observations Made in a Distributed Mobile Traffic Management System.
U.S. Appl. No. 61/671,544, filed Jul. 13, 2012, Dynamic Adjustment of Bandwidth Based on Prediction of User Behavior When Interacting With Mobile Applications Such as Dynamic Adjustment for Browsing or Streaming Activities.
U.S. Appl. No. 13/776,493, filed Feb. 25, 2013, Dynamic Bandwidth Adjustment for Browsing or Streaming Activity in a Wireless Network Based on Prediction of User Behavior When Interacting With Mobile Applications.
U.S. Appl. No. 13/274,265, filed Oct. 14, 2011, Caching Adapted for Mobile Application Behavior and Network Conditions.
U.S. Appl. No. 13/274,501, filed Oct. 17, 2011, Request and Response Characteristics Based Adaptation of Distributed Caching in a Mobile Network.

U.S. Appl. No. 61/583,434, filed Jan. 5, 2012, Detection and Management of User Interaction With Foreground Applications in a Distributed Caching Environment.
U.S. Appl. No. 13/735,868, filed Jan. 7, 2013, Detection and Management of User Interactions With Foreground Applications on a Mobile Device in Distributed Caching.
U.S. Appl. No. 61/512,275, filed Jul. 27, 2011, Heuristic Detection and Blocking of Malicious Applications in a Wireless Network Via a Distributed Proxy System.
U.S. Appl. No. 13/546,995, filed Jul. 11, 2012, Monitoring Mobile Application Activities for Malicious Traffic on a Mobile Device.
U.S. Appl. No. 13/547,001, filed Jul. 11, 2012, Automatic Generation and Distribution of Policy Information Regarding Malicious Mobile Traffic in a Wireless Network.
U.S. Appl. No. 61/533,007, filed Sep. 9, 2011, Distributed Caching in a Wireless Network of Content Delivered for a Mobile Application Over a Long-Held Request.
U.S. Appl. No. 13/274,250, filed Oct. 14, 2011, Distributed Caching in a Wireless Network of Content Delivered for a Mobile Application Over a Long-Held Request.
U.S. Appl. No. 61/533,021, filed Sep. 9, 2011, Application and Network-Based Long Poll Request Detection and Cacheability Assessment Therefor.
U.S. Appl. No. 13/651,247, filed Oct. 12, 2012, Application and Network-Based Long Poll Request Detection and Cacheability Assessment Therefore.
U.S. Appl. No. 61/559,513, filed Nov. 14, 2011, Mobile Network Parental Control.
U.S. Appl. No. 13/560,002, filed Jul. 27, 2012, Parental Control of Mobile Content on a Mobile Device.
U.S. Appl. No. 13/560,092, filed Jul. 27, 2012, Mobile Device Usage Control in a Mobile Network by a Distributed Proxy System.
U.S. Appl. No. 61/554,879, filed Nov. 2, 2011, Intelligent Mobile Advertising Targeted by Content, Application, Device, User or Timing Via a Distributed System in a Mobile Network.
U.S. Appl. No. 13/572,582, filed Aug. 10, 2012, Intelligent Placement and Delivery of Mobile Advertisements and Electronic Coupons Via a Distributed System in a Mobile Network.
U.S. Appl. No. 13/572,598, filed Aug. 10, 2012, Strategically Timed Delivery of a Advertisements or Electronic Coupons to a Mobile Device in a Mobile Network.
U.S. Appl. No. 61/567,373, filed Dec. 6, 2011, Public and Private Network Connection Detection and Management for Mobile Traffic.
U.S. Appl. No. 13/596,963, filed Aug. 28, 2012, Cellular or WIFI Mobile Traffic Optimization Based on Public or Private Network Destination.
U.S. Appl. No. 13/597,031, filed Aug. 28, 2012, Optimization of Mobile Traffic Directed to Private Networks and Operator Configurability Thereof.
U.S. Appl. No. 61/567,886, filed Dec. 7, 2011, Integration of a Traffic Management System and Method With a Network Operator/Service Provider.
U.S. Appl. No. 13/708,859, filed Dec. 7, 2012, Flexible and Dynamic Integration Schemas of a Traffic Management System With Various Network Operators for Network Traffic Alleviation.
U.S. Appl. No. 13/708,875, filed Dec. 7, 2012, Mobile Device Having Content Caching Mechanisms Integrated With a Network Operator for Traffic Alleviation in a Wireless Network and Methods Therefor.
U.S. Appl. No. 61/567,410, filed Dec. 6, 2011, Client Side and Server Failover Mechanisms in a Distributed Mobile Traffic Management.
U.S. Appl. No. 13/706,770, filed Dec. 6, 2012, System of Redundantly Clustered Machines to Provide Failover Mechanisms for Mobile Traffic Management and Network Resource Conservation.
U.S. Appl. No. 13/706,860, filed Dec. 6, 2012, Mobile Device and Method to Utilize the Failover Mechanisms for Fault Tolerance Provided for Mobile Traffic Management and Network/Device Resource Conservation.
U.S. Appl. No. 61/567,867, filed Dec. 7, 2011, Wireless Network Optimized Transport Protocol.
U.S. Appl. No. 13/708,758, filed Dec. 7, 2012, Radio-Awareness of Mobile Device for Sending Server-Side Control Signals Using a Wireless Network Optimized Transport Protocol.
U.S. Appl. No. 13/787,702, filed Mar. 6, 2013, Radio-Awareness of Mobile Device for Sending Server-Side Control Signals Using a Wireless Network Optimized Transport Protocol.
U.S. Appl. No. 61/570,684, filed Dec. 14, 2011, Hierarchy for Management and Tracking of Traffic and Network Optimization Policies.
U.S. Appl. No. 13/715,801, filed Dec. 14, 2012, Hierarchies and Categories for Management and Deployment of Policies for Distributed Wireless Traffic Optimization.
U.S. Appl. No. 61/570,724, filed Dec. 14, 2011, Mobile Network Reporting and Usage Analytics System and Method.
U.S. Appl. No. 13/710,274, filed Dec. 10, 2012, Mobile Network Reporting and Usage Analytics System and Method Aggregated Using a Distributed Traffic Optimization System.
U.S. Appl. No. 13/710,336, filed Dec. 10, 2012, System and Method for Generating a Report to a Network Operator by Distributed Aggregation of Data.
U.S. Appl. No. 61/570,703, filed Dec. 14, 2011, Operation Modes for Mobile Traffic Optimization and Concurrent Management of Optimized and Non-Optimized Traffic.
U.S. Appl. No. 13/715,900, filed Dec. 14, 201, Operational Modes for Mobile Traffic Optimization and Concurrent Management of Optimized and Non-Optimized Traffic.
U.S. Appl. No. 13/467,159, filed May 9, 2012, Selective Data Compression by a Distributed Traffic Management System to Reduce Mobile Data Traffic and Signaling Traffic.
U.S. Appl. No. 13/523,669, filed Jun. 14, 2012, Wireless Traffic Management System Cache Optimization Using HTTP Headers.
U.S. Appl. No. 61/740,392, filed Dec. 20, 2012, Management of Mobile Device Radio State Promotion and Demotion by Buffer and/or Activity.
U.S. Appl. No. 13/844,682, filed Mar. 15, 2013, Management of Mobile Device Radio.
U.S. Appl. No. 13/844,675, filed Mar. 15, 2013, Systems and Methods for Application Management of Mobile Device Radio State Promotion and Demotion.
U.S. Appl. No. 61/718,074, filed Oct. 24, 2012, Optimized and Selective Management of Policy Deployment to Mobile Clients in a Congested Network to Prevent Further Aggravation of Network Congestion.
U.S. Appl. No. 13/837,308, filed Mar. 15, 2013, Optimized and Selective Management of Policy Deployment to Mobile Clients in a Congested Network to Prevent Further Aggravation of Network Congestion.
U.S. Appl. No. 61/727,056, filed Nov. 15, 2012, Congestion Control Using Radio Aware Application.
U.S. Appl. No. 13/844,787, filed Mar. 15, 2013, Triggering Congestion Control for Radio Aware Application.
U.S. Appl. No. 13/844,704, filed Mar. 15, 2013, Triggering Congestion Control in a Manner Such That the Mobile Device Radio is Application Aware.
U.S. Appl. No. 61/756,926, filed Jan. 25, 2013, Signaling Optimization in a Wireless Network for Traffic Utilizing Proprietary and Non-Proprietary (HTTP) Protocols.
U.S. Appl. No. 13/844,726, filed Mar. 15, 2013, Signaling Optimization in a Wireless Network for Traffic Utilizing Proprietary and Non-Proprietary Protocols.

* cited by examiner

PROVISIONING APPLICATIONS FOR A MOBILE DEVICE

CROSS-REFERENCE TO RELATED APPLICATION(S)

This application is a continuation of U.S. patent application Ser. No. 12/215,481, filed Jun. 26, 2008, now U.S. Pat. No. 8,078,158 entitled PROVISIONING APPLICATIONS FOR A MOBILE DEVICE, which is incorporated herein by reference in its entirety.

TECHNICAL FIELD

The present disclosure generally relates to mobile devices. More specifically, the present invention relates to provisioning mobile device applications.

BACKGROUND

Presently available applications may be provisioned for use on mobile devices. Provisioning may include supplying and configuring resources of the mobile device to enable the mobile device to access and operate an application. Various applications may require certain configurations, settings, or software on a mobile device and/or software installed on a personal computing device. Examples of applications may include corporate email applications and marketing applications.

Many users do not have the knowledge, time, or patience to provision applications for their mobile devices. Absent such an undertaking, however, the application may never be fully installed or utilized to its full capacity. The application provider may lose any advantages that come with providing the application to the mobile device. The user also loses any advantages of having and being able to operate the application.

Another presently available way to provide the application to the mobile phone has been to initiate set-up of the application using a personal computing device. While some users may initiate the provisioning process using their personal computing device, a large number of users may not do so for lack of knowledge, ability, resources, inclination, etc. There is, therefore, a need in the art for improved methods and systems of provisioning applications for mobile devices.

SUMMARY

Exemplary systems and methods of the present invention provide for provisioning applications for a mobile device. A user browsing a mobile device may discover and request a new application. A request concerning the application is sent to a network server. The request includes information concerning the mobile device and/or the user of the mobile device. Using the mobile device information, the network server sends a communication accessible by a computing device associated with the user. In response to the communication, the user may choose to provide information to the network server. The information provided by the user is used to determine the requirements for operating the requested application on the mobile device. A hyperlink for downloading the requirements information is sent to the user of the mobile device via text messaging and/or email. The requirements information may be provided directly to the mobile device, to a personal computing device associated with the user of the mobile device, or a combination.

Various embodiments of the present invention include methods for provisioning a mobile device for operating an application. Such methods may include receiving information from the mobile device, sending a communication accessible by a computing device associated with the user based on the received information, determining the requirements for the mobile device to operate the application based on information provided by the user using the computing device, and providing the determined requirements to the user of the mobile device. The requirements may be provided for download using a hyperlink. The hyperlink may be provided to the mobile device via text message. Alternatively, the hyperlink may be emailed to an email address associated with the user of the mobile device. Some embodiments include downloading various requirements to a personal computing device associated with the user of the mobile device. Confirming that the mobile device is provisioned for operating the application and limiting operation of the application based on the confirmation may also occur.

An exemplary provisioning system may include a network server for receiving information from a mobile device associated with a user, sending a communication accessible by a computing device associated by the user, and for determining requirements for operating an application based on information provided by the user using the computing device, and an outbound communications server. The system may further include a device management module executable by the network server to manage various devices, including limiting operation of applications based on confirmation of provisioning of the mobile device.

Embodiments of the present invention include computer-readable storage media having embodied thereon programs that, when executed by a processor or computing device, perform methods for provisioning applications for a mobile device.

DETAILED DESCRIPTION

A user operating a mobile device may request a new application. A request concerning the application is sent to a network server. The request includes information concerning the mobile device and/or the user of the mobile device. The network server sends a communication that is accessible by a computing device associated with the user. The user may provide further information in response to the communication. The information provided by the user is used to determine the requirements for operating the requested application on the mobile device. The requirements information may be provided directly to the mobile device, to a personal computing device associated with the user of the mobile device, or a combination. In some embodiments, a hyperlink for downloading the requirements information is sent to the user of the mobile device via text messaging and/or email.

Figure 1:
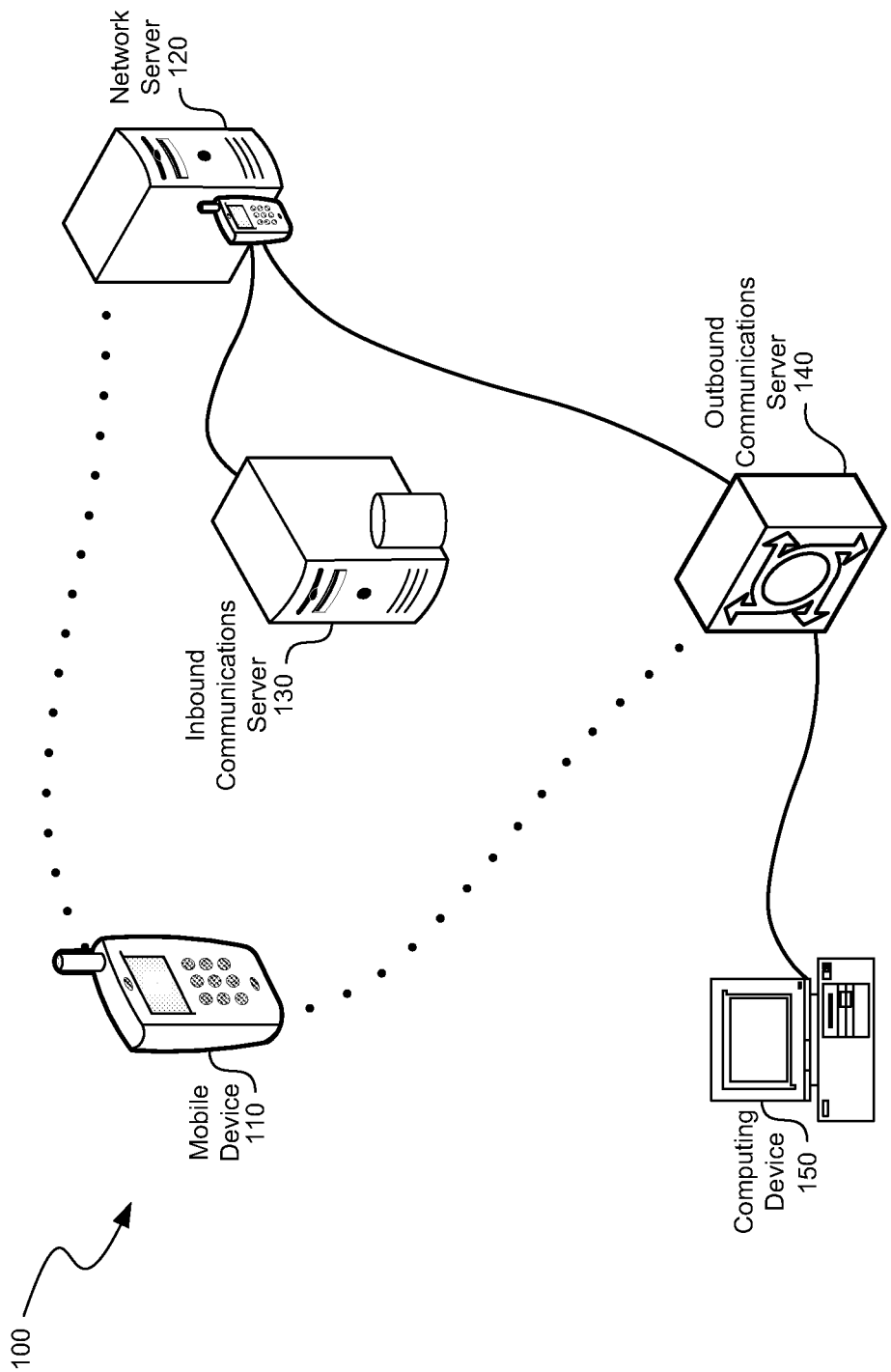
FIG. 1 is an exemplary system for provisioning a mobile device in a communications network.

FIG. 1 is an illustration of an exemplary implementation of a system for provisioning mobile device 110 using a communications network 100. In communications network 100, mobile device 110 can communicate with network server 120 wirelessly. The communications network 100 further allows for network server 120 to communicate over a wired or wireless connection with inbound communication server 130, outbound communication server 140, which can communicate with computing device 150 via email.

Communications network 100 may relate a variety of devices (e.g., mobile devices, computing devices) coupled to one another via a variety of communications channels (e.g., mobile telephone base stations, Internet). In that regard, networks should be interpreted as being inclusive rather than exclusive.

Mobile device 110 is inclusive of any variety of mobile devices that are capable of communicating over the Internet. Such communication may also include the use of a wireless or landline mobile network. Mobile device 110 is inclusive of cellular telephones, smart phones, PDAs, wireless e-mail devices, and handheld computers. A variety of mobile networks and communications channels for enabling Internet access are well known in the art.

Network server 120 may be any combination of computer hardware and software configured to receive and transmit information. Network server 120 may be, for example, an enterprise server, such as that found in any number of corporate entities and businesses. Network server 120 may be configured to communicate with multiple devices such as mobile device 110, inbound communications server 130, and computing device 150 via outbound communications server 140.

Inbound communications server 130 and outbound communications server 140 may be any kind of computing system that allows for various communications applications. Inbound communication server 130, in FIG. 1, provides user interfaces and download mechanisms for configuring settings and downloading components to network server 120. Network server 120 may then relay such interfaces and/or download mechanisms to mobile device 110 or to computing device 150.

Outbound communications server 140 provides information to the user of the mobile device 110 by, for example, email. Outbound communications server 140 may be an enterprise server such as that found in any number of corporate entities and businesses. Outbound communication server 140 may be configured to be accessed by multiple computing devices, such as computing device 150. In one example, the outbound communications server 140 may be a Microsoft® Exchange® server. Computing device 150 may access e-mail on the outbound communications server 140 through a client software application (not shown) such as Microsoft® Outlook®. Outbound communications server 140 may also store e-mail inboxes, contact lists, and various other types of data. Outbound communications server 140 may communicate with a mobile device (e.g., mobile device 110) or a computing device (e.g., computing device 150) over a local area network (LAN) and/or a wide area network (WAN) such as the Internet.

Computing device 150 may be any of a variety of desktop, laptop, or personal computer configured to communicate with outbound communications server 140 over, for example, the Internet. In some embodiments, computing device 150 may receive communications and requirements information. For example, a user of computing device 150 may receive an email prompting the user to provide certain information. The user may then use computing device 150 to respond and provide such information via a response email, a designated website, or the like. Further, the user may also receive emails including one or more hyperlinks for downloading requirements information, which may include configurations, settings, and various components for operating an application.

Figure 2:
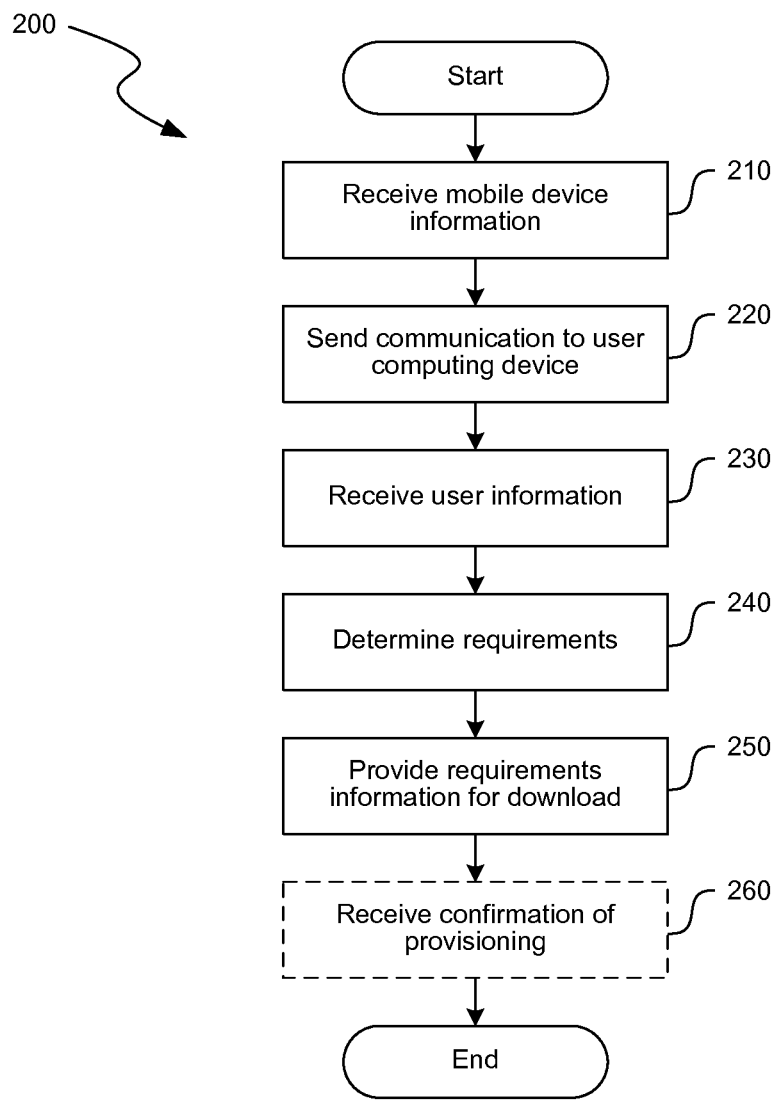
FIG. 2 is a flowchart depicting a method for provisioning a mobile device.

FIG. 2 is a flowchart depicting an exemplary method 200 for provisioning a mobile device. In the method 200, information concerning a mobile device is received. A communication accessible by a computing device associated with the user is sent. In response, the user may provide certain information. The necessary requirements for the mobile device to operate a particular application are determined based on the information provided by the user. A hyperlink to information concerning the requirements may optionally be generated and provided via email to a user of the mobile device. The hyperlink allows the user to download the determined requirements information, which may be used to provision the mobile device. Once the application is provisioned for operation on the mobile device, confirmation may optionally be received from the mobile device.

In step 210, information concerning the mobile device 110 is received at network server 120. The information may include, for example, phone numbers associated with the mobile device 110, email addresses associated with the mobile device 110, or email associated with the user of the mobile device 110. The information may further include current settings, configurations, and various components of the mobile device 110.

The communication of the information may be initiated automatically by the mobile device, by request of a user of the mobile device 110, or in response to a request from the network server 120. For example, mobile device 110 may include an indication concerning the application. A user interested in operating the application may select the indication. The selection may initiate the gathering of information from a memory and/or a subscriber identity module (SIM) card of the mobile device 110 and communication of the information to the network server 120.

In step 220, a communication accessible by a computing device 150 associated with the user is sent. For example, network server 120 may send an email to an email address received in step 210. Such an email may be accessed by the user using a computing device 150, which allows for more complex user interfaces than the mobile device 110. Further, some applications may require information concerning the computing device 150 (e.g., configurations) and/or that certain components be installed on computing device 150.

In step 230, user information is received. The communication sent by the network server 120 may request that the user provide certain information. The user using computing device 150 may be able to respond in a response email, at a designated (e.g. hyperlinked) website, or the like.

In step 240, the network server 120 determines, based on the received information, what requirements are necessary for operating an application on the mobile device 110. Requirements may include configuration, settings, and various components that are necessary for the mobile device 110 to operate the application. Network server 120 can evaluate the received information and determine what changes in configuration, setting, and components are needed for the mobile device 110 to operate the particular application. Alternatively, mobile device 110 may be able to determine the requirements for operating the particular application and request such requirements from the network server 120.

In step 250, the requirements information may be provided for download onto mobile device 110 and/or computing device 150. The information may concern various configurations, settings, and/or downloadable components. The requirements information may further include instructions to the user concerning provisioning the mobile device.

In some embodiments, the network server 120 may provide the requirements information by generating and sending a hyperlink for downloading information concerning the determined requirements. Generating a hyperlink may include storing the requirements information at a particular location on the network server 120 or inbounds communication server 130 and associating the hyperlink with the location. The hyperlink is sent to the user of the mobile device 110. In various embodiments of the present invention, the hyperlink may be sent to the mobile device 110 as a text message. Alternatively, the hyperlink may be sent in an email to an email address of the user. The user may be able to retrieve the email using the mobile device 110 and/or a computing device 150. Some applications may require, for example, that some configurations and/or software be installed on a computing device 160 associated with the user and/or a network service to order to enable the mobile device to access and operate those applications. Other means may be utilized for delivery of information concerning download of information as it pertains to determined requirements.

In an optional step 260, confirmation concerning provisioning of the mobile device is received by network server 120. In some embodiments of the present invention, network server 120 may include or be associated with or working in conjunction with another computing device including a device management module (not pictured). Execution of the device management module may limit operation of the application until confirmation is received from the mobile device 110.

Figure 3:
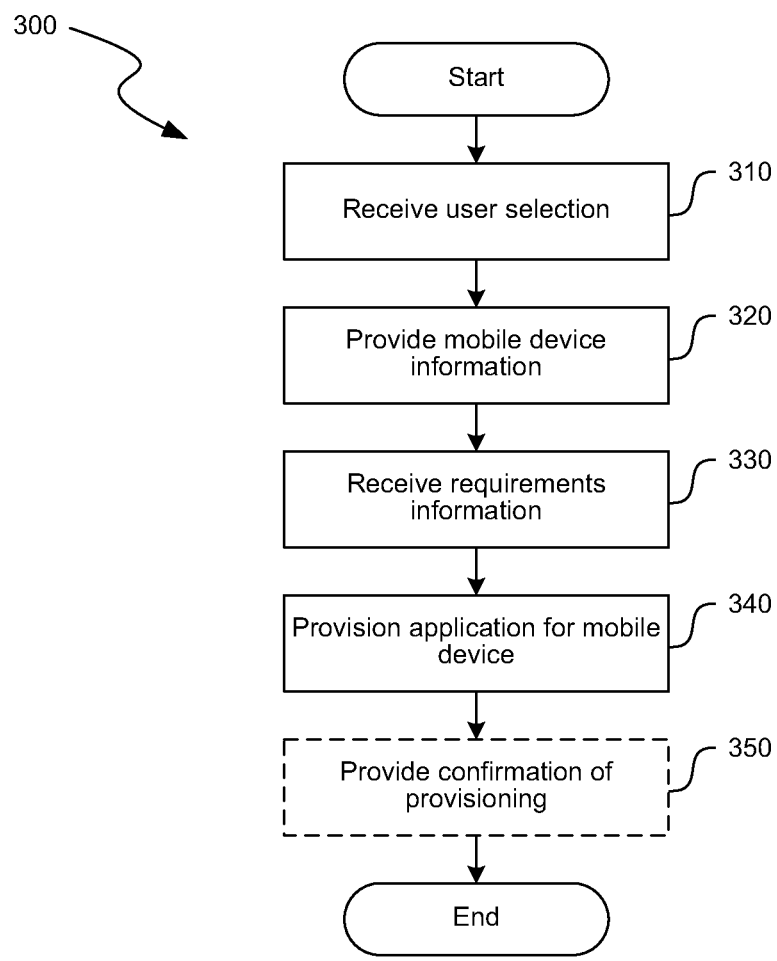
FIG. 3 is a flowchart depicting an alternative method for provisioning a mobile device.

FIG. 3 is a flowchart depicting another exemplary method 300 for provisioning a mobile device 110. In the method 300, a user selection is received concerning an application to be used on the mobile device 110. User information and mobile device information is provided as a part of or subsequent to that user selection. In response, information concerning requirements for operating an application on the mobile device 110 is generated and provided to the mobile device 110 although other information delivery/access methodologies may be used. The information may be used to provision the mobile device 110, and confirmation concerning the completed provisioning is optionally sent to the network server 120.

In step 310, a user selection is received concerning an application to be used on the mobile device 110. An indication concerning the application may be sent or made available on the mobile device 110. The user may choose to select the indication by clicking on an icon or pressing a button.

In step 320, mobile device information, which may include information concerning the user of the mobile device 110, may be provided to and received by the network server 120. The user information may be information previously provided by the user and stored on the phone in memory or a SIM card. Alternatively, the user selection may prompt a request for certain information, such as an email address for the user. Such information, along with information concerning the mobile device, may be sent to the network server 120 in, for example, an SMS text message.

In step 330, information concerning requirements for operating the desired application is received by the mobile device 110. For example, a hyperlink to downloadable information may be received in a text message or email received at the mobile device 110 or at the computing device 150. Depending on the application, the hyperlink may be used to download configurations, settings, or components onto the mobile device 110 and/or computing device 150. In some embodiments, the hyperlink may allow for download of a user interface or download mechanisms that facilitate the provisioning of the application for the mobile device 110. Other means for delivery of information to the device may be used as well.

In step 340, the mobile device 110 is provisioned based on the requirements information. For example, various configurations and settings may be implemented on the mobile device 110. Software components, for example, may be downloaded and installed on the mobile device 110. Further, the user interfaces and download mechanisms may help the user in provisioning the mobile device 110.

In an optional step 350, once the mobile device 110 has been provisioned for use with the desired application, confirmation may be sent. The mobile device 110 may automatically or upon request send a communication to network server 120 indicating that the mobile device 110 is provisioned and ready to operate the particular application.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile and volatile media as well as transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

I claim:

1. A method for provisioning a mobile application for a mobile device, the method comprising:
   sending a communication accessible on a computing device based on a request for the mobile application;

determining configuration information for the mobile device to operate the mobile application based on information provided via the computing device in response to the communication; and providing the configuration information to the mobile device for use in provisioning the mobile application;

wherein, the configuration information for the mobile device, specifies components to be installed to provision the mobile application on the mobile device; and confirming that the mobile device is provisioned for operation the mobile application.

2. The method of claim 1, wherein the request is initiated via the mobile device.

3. The method of claim 1, wherein the configuration information includes a setting to be implemented for the mobile device to operate the mobile application.

4. The method of claim 1, wherein the configuration information includes a network service to be implemented for the mobile device to operate the mobile application.

5. The method of claim 1, wherein the configuration information includes, one or more of, executing or installing a downloadable component for the mobile device to operate the mobile application.

6. The method of claim 1, wherein, the communication accessible on the computing device, includes an information request from a user of the mobile device.

7. The method of claim 1, wherein, the communication accessible on the computing device, includes an information request from a user of the mobile device, the user being able to respond to the information request via a website or in a response email.

8. The method of claim 1, further comprising, generating a hyperlink for downloading the configuration information, wherein the hyperlink is provided to the mobile device.

9. The method of claim 8, wherein the hyperlink is provided in a text message to the mobile device.

10. The method of claim 8, wherein the hyperlink is provided in an email to the mobile device.

11. The method of claim 1, further comprising limiting operation of the mobile application on the mobile device based on the confirming.

12. A system for provisioning an application for a mobile device, the system comprising:

means for, responsive to detecting selection of the application made at the mobile device, identifying, from the mobile device, user information and mobile device information of the mobile device;

wherein, the user information and the mobile device information concerning the mobile device are provided to a server for use in determining requirements for operating the application on the mobile device;

means for, provisioning the application on the mobile device based on the requirements for operating the application;

wherein, the requirements for operating the application, specify components to be installed to provision the application on the mobile device; and means for confirming that the mobile device is provisioned for operating the application.

13. The system of claim 12, wherein, the user information and the mobile device information are sent in an SMS text message.

14. The system of claim 12, wherein, the requirements for operating the application are received in a hyperlink at the mobile device.

15. The system of claim 14, wherein, the hyperlink is received in an SMS text message or in an email message.

16. The system of claim 12, wherein, the requirement information for operating the application includes, one or more of, a setting or a network service to be implemented for the mobile device to operate the application.

17. The system of claim 12, wherein, the user information is stored in device memory or on a SIM card of the mobile device.

18. A method for provisioning an application for a mobile device, the method comprising:

determining configuration information for the mobile device to install or operate the application based on information provided via a computing device in response to a communication generated in response to a request for the application; and providing the configuration information to the mobile device for use in provisioning the application;

wherein, the configuration information of the mobile device, specifies components to be installed to provision the application on the mobile device;

confirming that that mobile device is provisioned for operating the application; and limiting operation of the application on the mobile device based on the confirming.

19. The method of claim 18, wherein the request is initiated via the mobile device.

20. The method of claim 18, wherein the configuration information includes, one or more of, executing or installing a downloadable component for the mobile device to operate the application.

21. A method for provisioning an application for a mobile device, the method comprising:

sending or receiving an application-specific communication accessible on a computing device associated with a user of the mobile device based on a request for the application;

determining configuration settings, including installation components for provisioning the application, for the mobile device to operate the application based on information provided via the computing device in response to the application-specific communication;

determining configuration settings, including installation components to allow the mobile device to access and operate the application, for the computing device; and providing the configuration settings for the mobile device to the mobile device and the configuration setting for the computing device to the computing device for use in provisioning the application.

22. The method of claim 21, wherein, the application-specific communication includes an information request from the user of the mobile device.

23. The method of claim 22, wherein, the user is able to respond to the information request via a website.

* * * * *